United States Patent [19]
Schreitmueller et al.

[11] Patent Number: 5,839,112
[45] Date of Patent: Nov. 17, 1998

[54] METHOD AND APPARATUS FOR DISPLAYING AND SELECTING VEHICLE PARTS

[75] Inventors: James Schreitmueller, San Ramon; Gerhard Blendstrup, Lafaette; Nasser Shariatpanahy, Danville, all of Calif.

[73] Assignee: Automatic Data Processing, San Ramon, Calif.

[21] Appl. No.: 365,520

[22] Filed: Dec. 28, 1994

[51] Int. Cl.⁶ .................................................. G06T 1/00
[52] U.S. Cl. ............................................. 705/4; 345/326
[58] Field of Search .................................... 395/147, 793, 395/797, 348, 349, 352, 353; 364/401 R, 474.24; 707/502; 345/420, 326, 348, 349, 352, 353; 705/4; 701/1, 29

[56] References Cited

U.S. PATENT DOCUMENTS

| | | | |
|---|---|---|---|
| 4,899,292 | 2/1990 | Montagna et al. | 395/147 |
| 5,146,404 | 9/1992 | Calloway et al. | 364/401 |
| 5,414,626 | 5/1995 | Boorse et al. | 364/424.03 |
| 5,432,904 | 7/1995 | Wong | 395/161 |
| 5,485,560 | 1/1996 | Ishida et al. | 345/433 |
| 5,504,674 | 4/1996 | Chen et al. | 345/340 X |
| 5,515,269 | 5/1996 | Willis et al. | 364/401 |
| 5,655,087 | 8/1997 | Hino et al. | 705/29 |
| 5,689,435 | 11/1997 | Umney et al. | 364/512 |

OTHER PUBLICATIONS

Mastering Windows 3.1, Special Edition, Robert Cowart, 1992.

*Primary Examiner*—Joseph H. Feild
*Attorney, Agent, or Firm*—Hecker & Harriman

[57] ABSTRACT

The present invention is an insurance estimating system that presents a number of advances over the prior art. The invention enables an insurance estimator to quickly and accurately estimate damage to various parts of a vehicle. The invention allows the estimator to analyze damage to various "layers" of a vehicle. If damage to an outer layer of a vehicle is visible, the insurance estimator will quickly perform a damage estimate using the catastrophe or drill in and drill out features of the invention. Nevertheless, the estimator will be reminded to also look for damage in lower layers of the vehicle that are not readily visible. Conversely, an estimator may begin estimating damage to a vehicle by focusing on the interior of a vehicle which has significant interior damage. The invention then reminds the estimator not to overlook slight damage to outer layers of the vehicle. The catastrophe feature of the invention permits insurance estimators to quickly and accurately perform a large number of damage estimates when damage is primarily to outer layers of the vehicle, such as damage resulting from hail, sand, or flood. The invention allows an insurance estimator to select a desired vehicle part for repair, replacement, or other operations, in a number of quick and convenient ways, and gives the estimator a number of options. The invention also prevents "double charging" when there is a possibility that a vehicle part may be selected more than once.

20 Claims, 22 Drawing Sheets

| Claims | Administrative | Contents | Estimates | Damages | Rates/Totals | Reports | Notes |

F9488-578948857-894885787 Donald Peterson 91 Jeep

Vehicle ID — 40     Supp2

Claim Information
- Claim # : A - 103257
- Policy # : F-119-7
- Loss Date : 00-00-00
- ☐ Loss Type : UNK
- File Handler :
- File # :
- Accounting # :

Inspection
- ☐ Appraiser :
- Inspection Date: - -
- ☐ Type : DRIVE IN

Owner
- ☐ Owner Name : WILLIAM ANDERSON

Repair Facility
- ☐ Shop Name : ACME AUTO
- Car In : 00-00-00
- Car Out : 00-00-00

☐ Estimate Remarks

- Company : ABC INSURANCE
- Agent : SAMUEL ADAMS
- Agent Phone : (000) 000-0000 x0000
- Insured : FRED ROGERS
- Claimant : WILLIAM ANDERSON
- Loss Payee :
- Second Payee:

- Location :
- Location City :
- Location State : CA

Days to Repair :

Print   Setup

Claim Information

- Claim # : F-1034
- Policy # : F-119-7
- Loss Date : 00-00-00
- Type of Loss : COMP
- File Handler :
- File # :
- Accounting # :

ABC Insurance Co.
1542 E. Main
San Ramon   CA   94583

- Company : ABC Insurance
- Agent : SAMUEL ADAMS
- Agent Phone : (000) 000-0000
- Insured: Fred Rogers
  WILLIAM ANDERSON
- Loss Payee :
- Second Payee :
- Phone : (000) 000-0000
- Location City : San Ramon
- State : CA

Inspection

- Appraiser : C. Jacobs
- Date : 00-00-00
- Type :

State:

Owner

- Name : WILLIAM ANDERSON
- Address : 222 E. Clarksburg
- City : San Ramon
- Zip : 94583
- Home Phone : (000) 000-0000
- Work Phone : (000) 000-0000

- Car In : 00-00-00
  00-00-00
- Days to Repair : _____

Repair Facility

- Shop Name : ACME AUTO
- Attention :
- Phone : (000) 000-0000

Tabs: Claims | Contents | Estimates | Reports | Notes | Summary

F9488-578948857-894885787 Donald Peterson 91 Jeep

Print   Setup

*FIG. 10B*

METHOD AND APPARATUS FOR DISPLAYING AND SELECTING VEHICLE PARTS

BACKGROUND OF THE INVENTION

1. Field of the Invention

The present invention relates to an estimating system, and more particularly to a stand alone insurance estimating system, such as one used for automobile accident damage estimating, which can be used by automobile insurance appraisers and repair facilities to obtain information about parts, labor, and repair operations for automobile repairs.

2. Background Art

Computerized insurance estimating systems are known. Such insurance estimating systems provide access to large amounts of parts information, such as parts' prices, availability of economy or OEM parts, labor estimates and parts replacement operations. Furthermore, various systems for storing and retrieving text and associated data and graphics are known. For example, text, menus and graphics have been stored in computer memory and displayed in separate windows on a screen. Controls have also been provided to scroll windows up, down, left, and right to thereby display different portions of text, menus and graphics.

It is known to store text and reference numbers indicating the location of associated graphics in memory. Graphics are displayed integral with the text, that is, portions of pages of the text are devoid of text and filled instead with graphics. Known systems are also capable of enlarging and centering graphics.

In the automobile repair and insurance industries, manuals are used to provide insurance estimators or mechanics with parts availability, repair, and replacement cost, and further with labor time and cost. For example, an insurance estimator views a damaged automobile, and determines either through observation or a parts manual, the parts which are damaged. Then, the adjuster estimates cost of repair by looking up in various manuals the cost for each of the damaged parts and the specified labor time for repair. This procedure is cumbersome because more than one manual may be required to make the estimations, and after the initial write-up the information may have to be transcribed to another form in order to more easily understand and communicate the information. Moreover, entire manuals need be searched for information. Furthermore, this procedure does not ensure that the estimator notices every damaged part since many small parts comprising larger parts may not be readily visible.

In one known insurance estimation system, an estimator identifies the model of a damaged automobile and then locates in a file cabinet a hard copy multi-worksheet form corresponding to the model. The worksheets include several different views of the model, part numbers, and lines leading from the part numbers to the corresponding parts. The estimator circles the part numbers of the damaged parts and then, a computer operator enters the part numbers in a computer which estimates cost of repair. The identification of many small damaged parts, the searching through all the worksheets, and the entry of part numbers into the computer are all cumbersome and prone to error. Prior art computerized estimation systems work essentially as described above, except that the worksheets are displayed on a computer screen instead of being in hard copy.

Furthermore, to estimate damage to entire exterior sheet metal of automobiles, for example, damage resulting from hail, sand, or flood, prior art systems require the break-up of the exterior sheet metal into individual sections. For example, the exterior sheet metal may be divided into the hood, the rear and front, the fenders, and four doors. Thus, the prior art requires that each section of the exterior sheet metal be separately located on a worksheet or recalled on a computer screen. Then the damage estimate to each section of the exterior sheet metal is performed. This procedure is slow and prone to error because many of small sections comprising the exterior sheet metal may not be noticed.

Montagna et al (U.S. Pat. No. 4,899,292) discloses a system for storing and retrieving text and associated graphics. The system includes a service manual with a document that consists of text describing steps for repairing a vehicle and graphic images for showing damaged portions of a vehicle. The system displays a graphic image of a vehicle, and damaged parts of the vehicle are identified by means of a touch screen. In particular, Montagna et al's system can display a work sheet shown in FIG. 13 and graphic images shown in FIGS. 14 and 15. See column 13, lines 31 through 53. With the aid of the work sheet and the graphic images possible damaged regions of a vehicle can be selected. However, Montagna et al do not teach, disclose or suggest an insurance estimating system that groups vehicle parts in layers of various depth such that an estimator has a systematic and error free way of probing behind the visibly damaged parts to identify damaged parts that are not readily visible. Further, Montagna et al do not teach, disclose or suggest a means to estimate damage to an entire exterior sheet metal of a vehicle without the need to divide the sheet metal into separate sections.

There is need in the art for a simple and error free insurance estimating system for identification of damaged parts and for estimating costs of repair and replacement. Further there is need for an estimating system which guides an estimator through identification of many small and not readily visible damaged parts. There is also need for a systematic and error free way to probe "behind" the visibly damaged parts to identify the not so readily visible damaged parts. There is further need for a way to estimate damage to an entire exterior sheet metal of automobiles without the need to divide the sheet metal into separate sections.

SUMMARY OF THE INVENTION

The present invention is an insurance estimating system that presents a number of advances over the prior art. The invention enables an insurance estimator to quickly and accurately estimate damage to various parts of a vehicle. The invention allows the estimator to analyze damage to various "layers" of a vehicle. If damage to an outer layer of a vehicle is visible, the insurance estimator will quickly perform a damage estimate using the catastrophe or drill in and drill out features of the invention. Nevertheless, the estimator will be reminded to also look for damage in lower layers of the vehicle that are not readily visible. This is because in the insurance estimating system of the invention, vehicle parts are grouped in layers, and the layers are organized in the order of distance from the exterior sheet metal of the vehicle. As the estimator uses the drill in feature of the invention, he or she will be reminded to check for damage in "lower" layers of the vehicle. Conversely, an estimator may begin estimating damage to a vehicle by focusing on the interior of a vehicle which has significant interior damage. The invention then reminds the estimator not to overlook slight damage to outer layers of the vehicle. This is because, as the estimator "drills out of" the interior of the vehicle, he will be reminded to look for damage at outer layers, such as the exterior sheet metal.

The catastrophe feature of the invention permits insurance estimators to quickly and accurately perform a large number of damage estimates when damage is primarily to outer layers of the vehicle, such as damage resulting from hail, sand, or flood. In case of damage from natural phenomena, such as hail, sand, or flood, a large number of vehicles are damaged in a short period of time. By utilizing the catastrophe feature, a large number of vehicles can be processed quickly and accurately in "drive through" insurance estimating centers.

The invention allows an insurance estimator to select a desired vehicle part for repair, replacement, or other operations, in a number of quick and convenient ways, and gives the estimator a number of options. A vehicle part of interest can be selected for processing by using the vehicle part name in a textual list, the part's graphic icon, or the part's "hot spot." This "multiple selection" feature of the invention further allows an estimator to quickly and accurately estimate damage to vehicles. The invention also prevents "double charging" when there is a possibility that a vehicle part may be selected more than once while using the catastrophe and drill in/out features, or while using the multiple selection feature of the invention. Other features and advantages of the invention will be apparent from the detailed description of the invention and the drawings.

BRIEF DESCRIPTION OF THE DRAWINGS

FIG. 3A shows the contents of Administrative page 30.

FIG. 3B shows a virtual calendar keyboard invoked by using the loss date line in Administrative page 30.

FIG. 3D shows an example of a completed screen in Administrative folder 30.

FIG. 4 shows a screen in Vehicle ID folder for identifying a vehicle prior to estimating damage.

FIG. 5B shows a "mini" list showing only those vehicle subsections that are below a selected main vehicle section.

FIG. 5D shows an example of a user selecting display of the graphics section, and deselecting display of the textual list.

FIG. 6A shows the main vehicle section of front bumper selected by a user in a "split mode."

FIG. 10B shows a page of the "Reports" folder.

DETAILED DESCRIPTION OF THE INVENTION

An insurance estimating system is described. In the following description, numerous specific details are set forth in detail in order to provide a more thorough understanding of the present invention. It will be apparent, however, to one skilled in the art, that the present invention may be practiced without these specific details. In other instances, well known features have not been described in detail so as not to obscure the present invention.

Figures 1, 9:
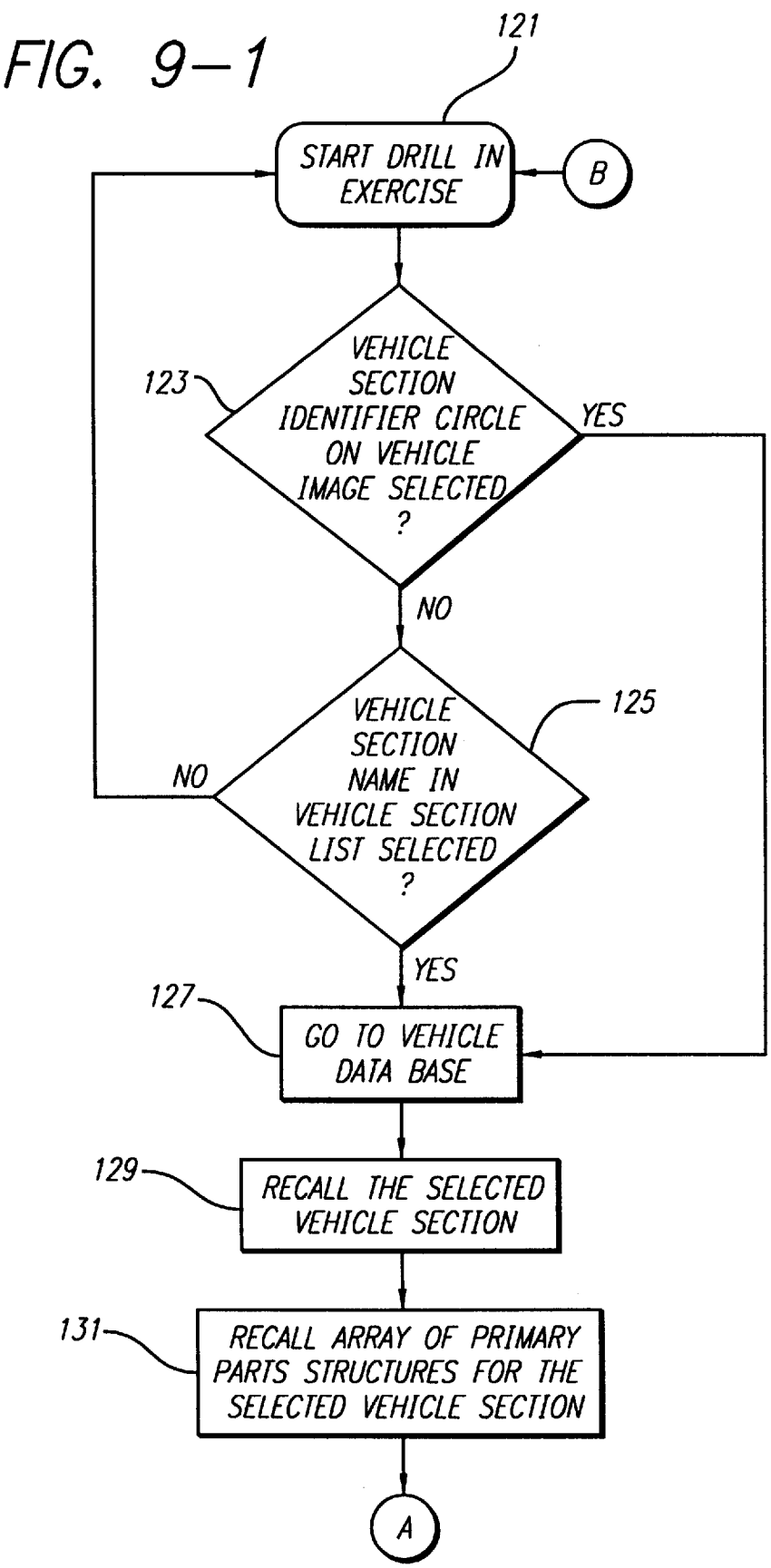
FIG. 1 shows the first screen of an application program for the insurance estimating system of the present invention.
FIG. 9 is a flowchart illustrating how the drill in and catastrophe features of the present invention are implemented.
Figures 2, 9:
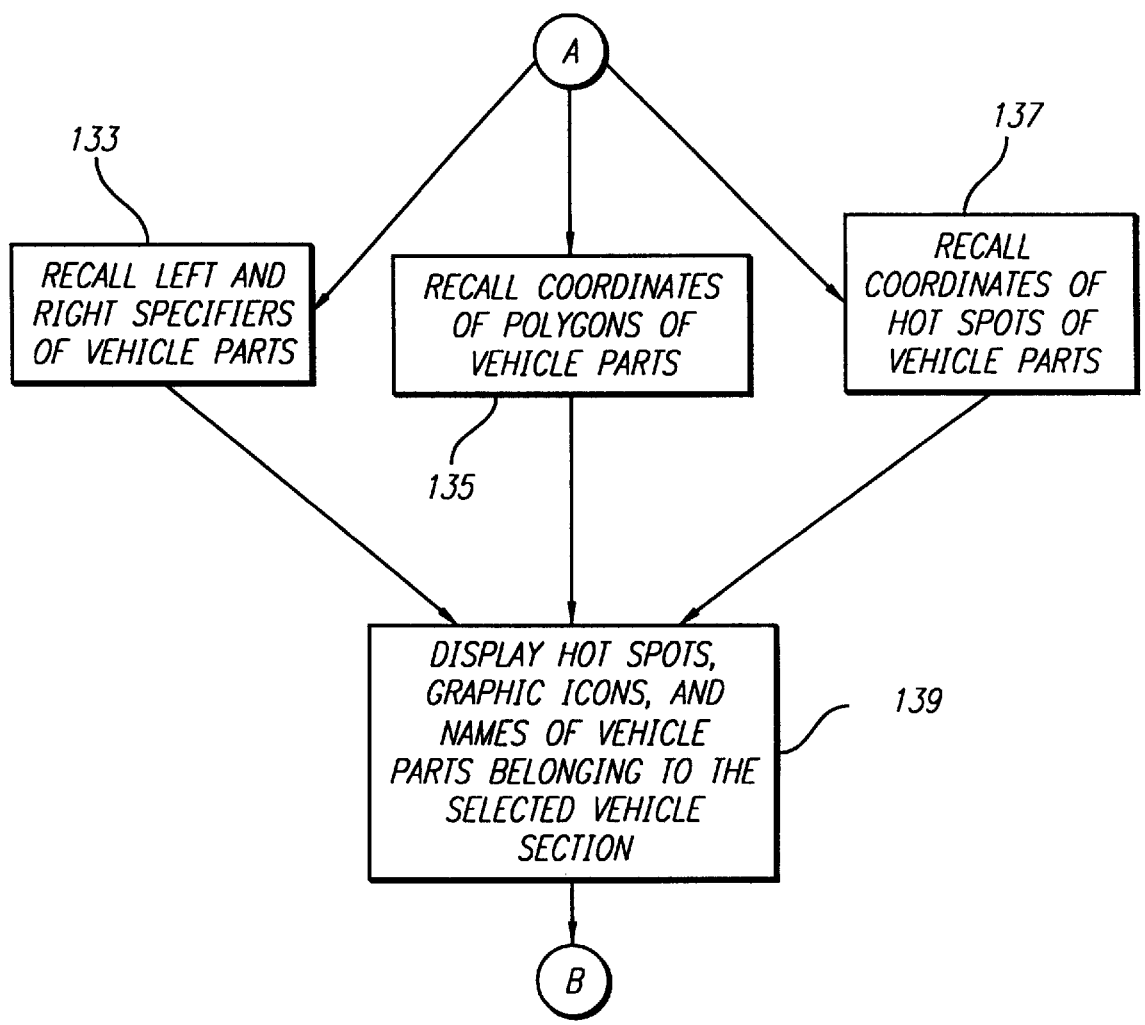

FIG. 1 shows the first screen of an application program for the insurance estimating system of the present invention. The first screen opened by the application program is screen 100. This screen displays several folder tabs. These are Claims tab 12, Contents tab 14, Estimates tab 16, Reports tab 18, and Notes tab 20. An optional Forms tab (not shown in FIG. 1, but shown in some of the Figures, such as FIG. 6A) may be shown between Report tab 18 and Notes tab 20. (Clicking on the Forms tab enables the user to utilize various forms in arriving at an insurance damage estimate). When the first screen of the application program is opened, in which the Claims folder is automatically selected. This is shown by the highlighted Claims tab 12. The remaining folders, namely, Contents, Estimates, Reports, and Notes, are parts of the Claims folder. Each of the Contents, Estimates, Reports, or Notes folder tabs can be selected in a manner known in the art, for example by using a keyboard, a cursor and a mouse, or a pen and a touch-sensitive screen. In the preferred embodiment of the present invention, a pen and a touch-sensitive screen is used. Each item which is available for selection by a user is displayed on the touch-sensitive screen. Selection of an item is then accomplished by "clicking" the pen on the touch-sensitive screen, on the item to be selected. For simplicity, the following description of the invention refers to the preferred embodiment using a pen and a touch-sensitive screen.

Screen 100 is divided into several fields. A Claim # field 22 contains the claim number assigned to each claim entered into and processed by the application program. An Owner field 24 displays the name of the owner of the vehicle for which a claim has been entered. A Vehicle field 26 contains the make and model of the vehicle corresponding to the entered claim. A User field 28 specifies the name of the operator of the vehicle at the time the event giving rise to the claim occurred. A Date field 30 contains the date at which the event giving rise to the claim occurred. The remaining portions of screen 100 are not of interest to the present application.

Figure 2:
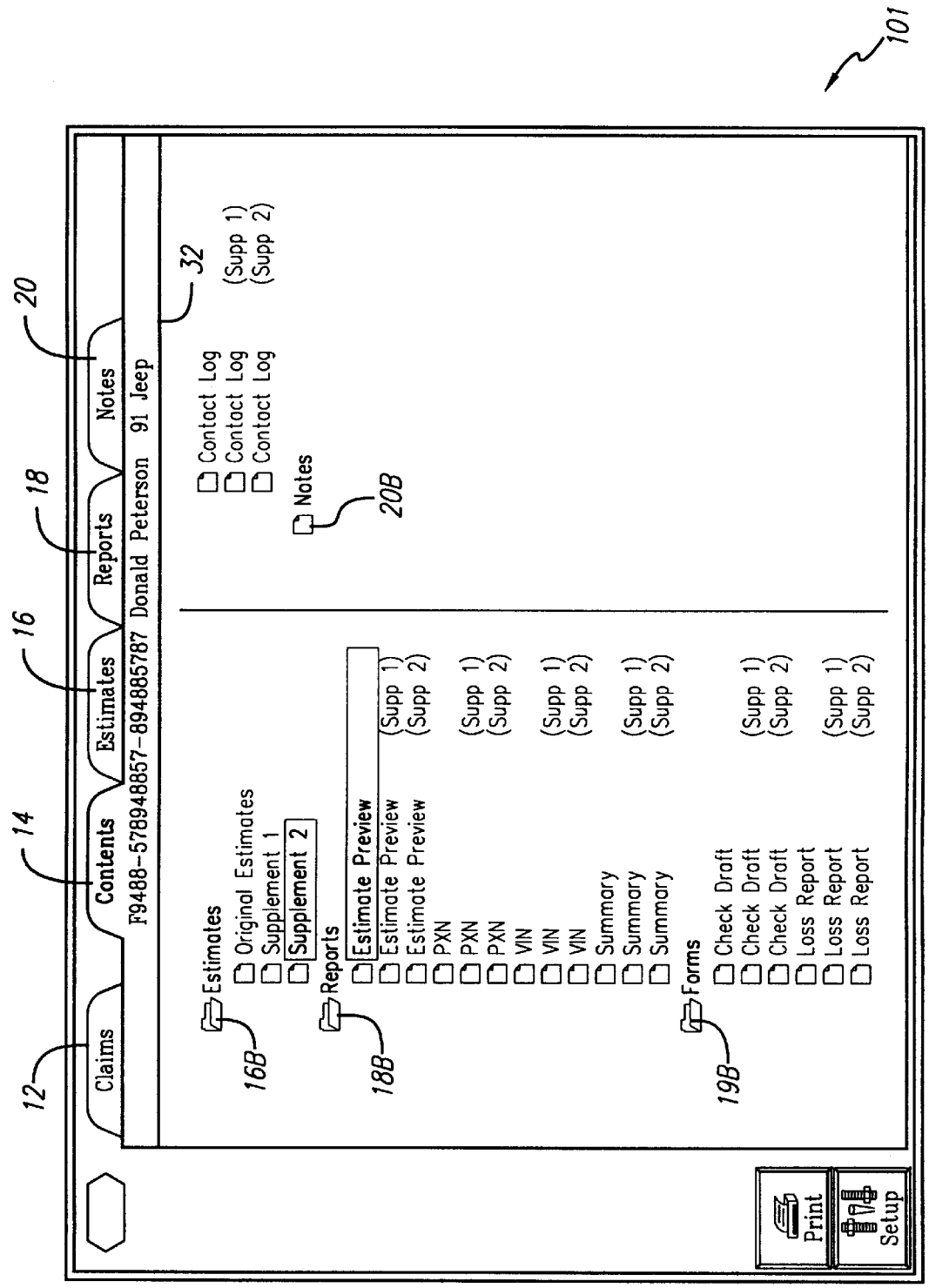
FIG. 2 shows a screen which is displayed by the application program of the present invention upon selecting the Contents folder.

FIG. 2 shows screen 101 which is displayed by the application program of the present invention upon selecting the Contents folder by clicking the pen once on the Contents folder tab 14. The Contents folder provides a "table of contents" for what is stored in each folder for a claim of interest, such as claim 32 shown in screen 101. The Contents folder displays several folders and their respective pages. The first folder is the Estimates folder 16B. The pages within this folder are Original Estimate, Supplement 1, and Supplement 2 as shown in FIG. 2. These pages are pages that can also be accessed by selecting Estimates folder tab 16. The second folder shown in screen 101 is Reports folder 18B. This folder corresponds to Reports folder tab 18. The various pages shown under Reports folder 18B, such as the Estimate preview pages, PXN pages, VIN pages, and Summary pages, provide a mechanism for a final review, and possible modification, of a damage estimate prepared by the user. Forms folder 19B contains various insurance estimating forms, such as Check Draft and Loss Report forms, which are not of interest in describing the present invention. Notes folder 20B corresponds to Notes 20 folder tab and contains notes recorded by an insurance estimator with respect to claim 32 shown in screen 101. Each folder shown on screen 101 can be opened either by clicking the pen once on the folder icon displayed on screen 101 (for example, Estimates folder 16B), or by clicking on the corresponding folder tab displayed on top of screen 101 (for example, Estimates tab 16). Further, each page within a folder can be selected by clicking on the page icon shown in screen 101, or alternatively, by selecting the page after the folder is opened.

Figure 3A:
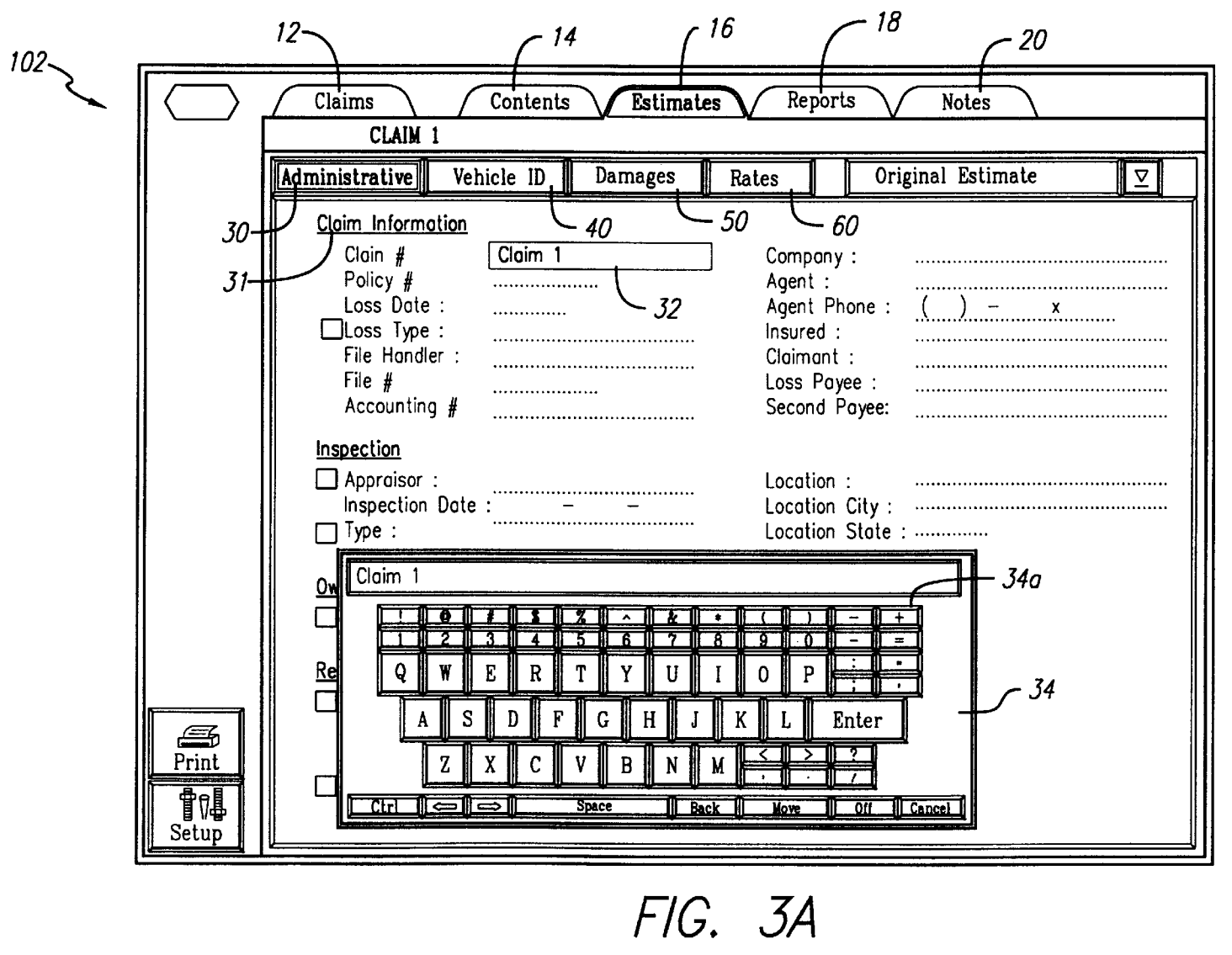

Clicking the pen once on Estimates tab 16, causes screen 102 shown in FIG. 3A to be displayed. Screen 102 shows the contents of Administrative page 30. The remaining pages within the Estimate folder are Vehicle ID page 40, Damages page 50, and Rates/Totals page 60. These pages, as well as Administrative page 30, are identified by labels in the horizontal bar shown near the top portion of screen 102. As shown in FIG. 3A, the first page opened and available for inputting data is Administrative page 30. This page is used for inputting and processing information related to a damage claim, inspection report, and other administrative information.

A claim information section 31 contains a claim number line, a policy number line, a loss date line and other lines as shown in FIG. 3A. Each line in the claim information section 31 can be filled by using either an actual keyboard (not shown) connected to a computer on which the application program runs, or from a virtual keyboard. The virtual keyboard automatically appears on screen 102 in response to a user selecting a line of information to be completed. Three types of virtual keyboards can be displayed by the application program depending on the type of information that a certain line is designed to accept. These three types are an alphanumeric keyboard, a calendar keyboard, and a numeric keyboard. For example, since a claim number may have both numerical and alphabetic characters, the virtual keyboard displayed for completing the claim number line is an alphanumeric keyboard. Thus, virtual alphanumeric keyboard 34 automatically appears on screen 102 in response to a user selecting the claim number line of claim information section 31. A user may choose not to utilize the display portion of virtual alphanumeric keyboard 34. In that case, display portion 34a is not available and thus "Claim 1" shown in display portion 34a is not shown. This selection is shown by rectangle 32 surrounding the claim number line. The user can utilize virtual keyboard 34 by clicking the pen on a desired "virtual key" of the keyboard. The policy number line in claim information section 31 also accepts alphanumeric information, and as such, selection of the policy number line also invokes alphanumeric virtual keyboard 34.

Figure 3B:
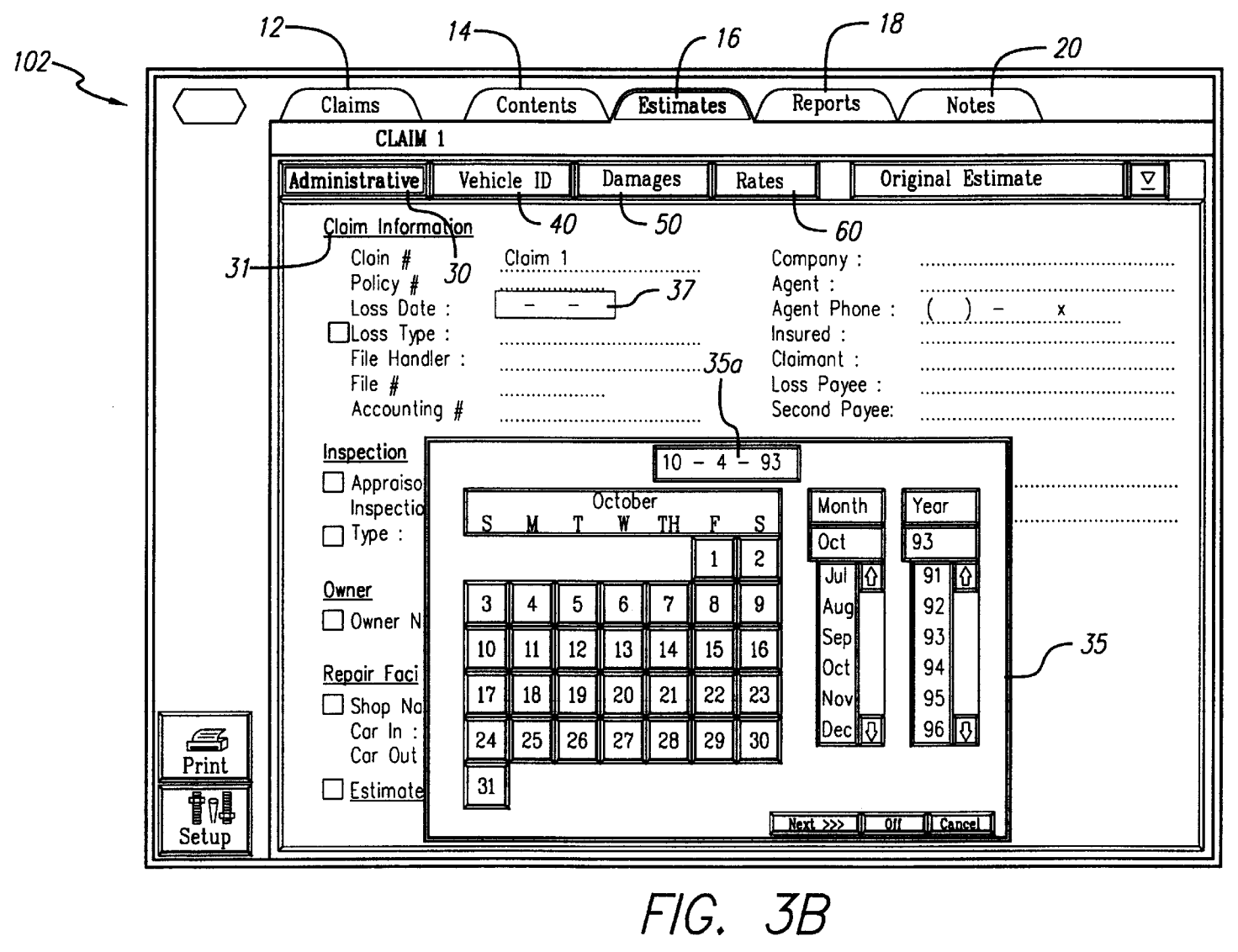
Figure 3C:
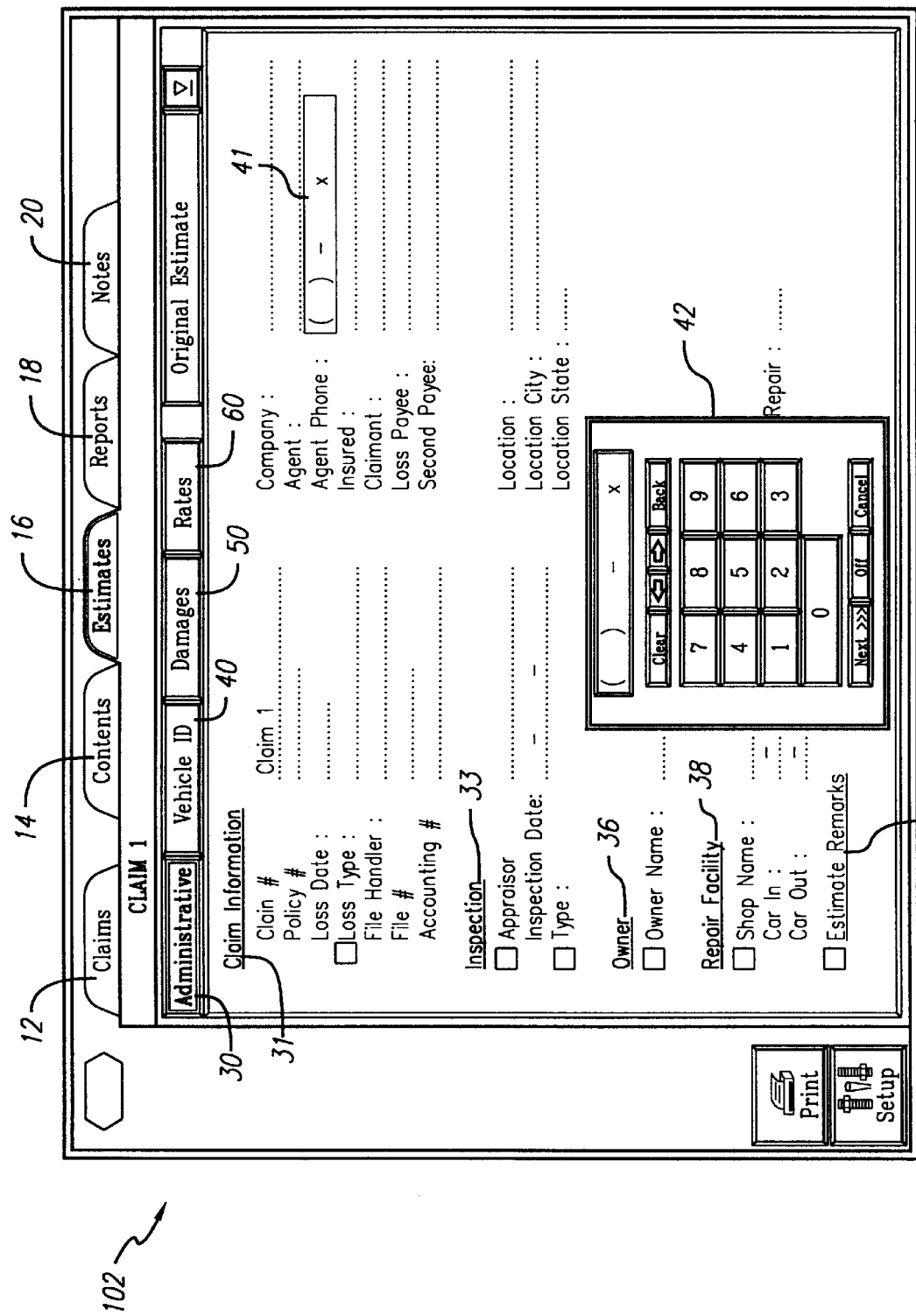
FIG. 3C shows a virtual numeric keyboard invoked by using the agent phone line in Administrative page 30.

Selection of the loss date line in claim information section 31 invokes virtual calendar keyboard 35 shown in FIG. 3B. As shown in FIG. 3B, rectangle 37 automatically appears on screen 102 upon the selection of the loss date line. By clicking on the appropriate "virtual key" on virtual calendar keyboard 35, a user can enter the desired date in the loss date line. The configuration of virtual calendar keyboard 35 may be different from that shown in FIG. 3B. For example, display portion 35a may not be available. In that case the date, namely "10-04-93", would not be shown on virtual calendar keyboard 35. As shown in FIG. 3C, selection of the agent phone line of claim information section 31 invokes a virtual numeric keyboard 42. This selection is indicated by rectangle 41 surrounding the agent phone line in claim information section 31. The remaining sections of the administrative folder shown in screen 102, namely, inspection section 33, owner section 36, repair facility section 38, and estimate remarks section 39 are also completed by clicking on, i.e. selecting, a desired line. A virtual keyboard automatically appears in response to the selection. The user then enters the desired information by using the virtual keyboard. FIG. 3D shows an example of a completed screen 102 in Administrative folder 30.

Figure 4:
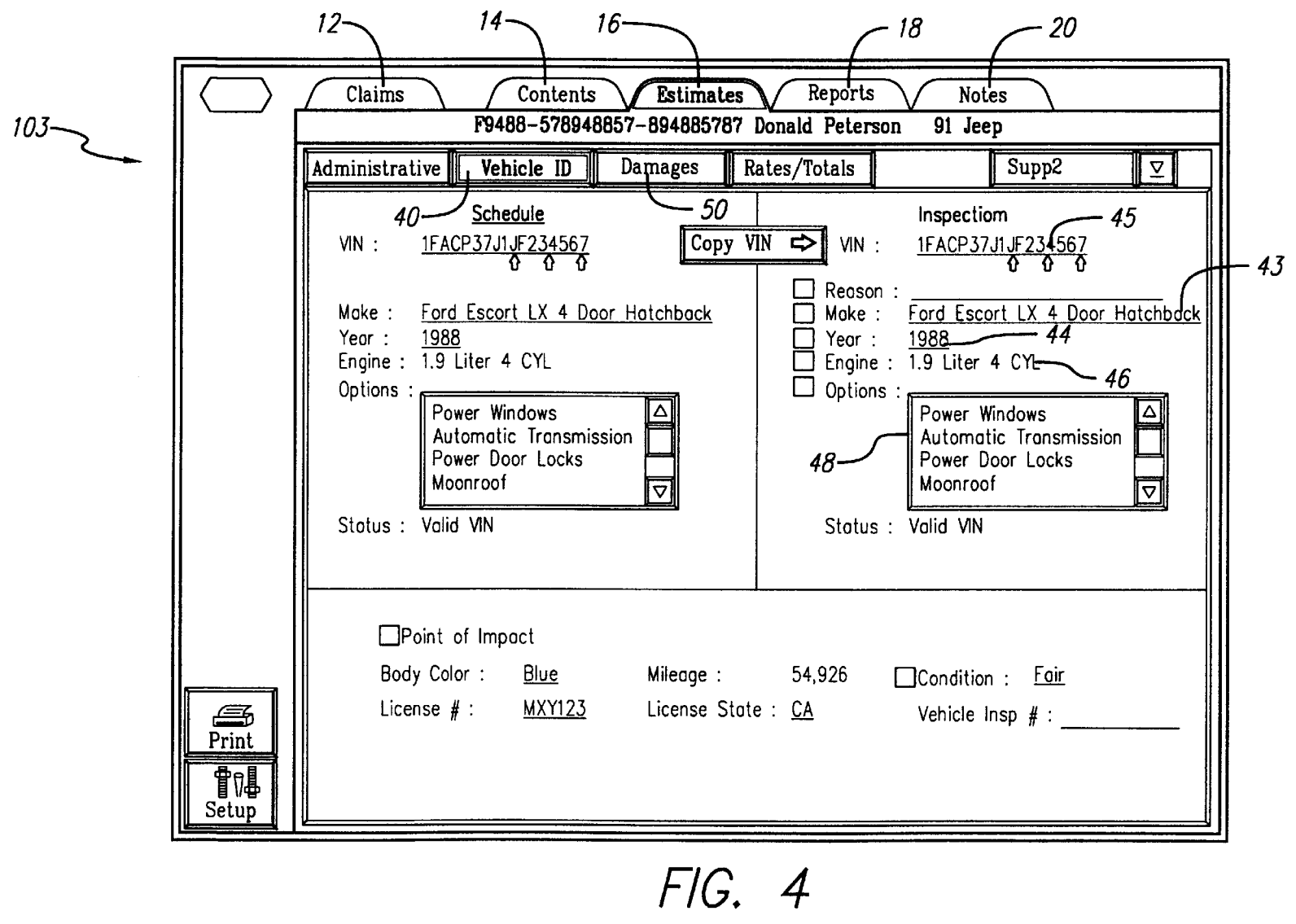

Clicking the pen once on Vehicle ID folder tab 40 opens screen 103 shown in FIG. 4. A vehicle must be properly identified prior to proceeding with the damage estimating system of the present invention. One reason for this is that identification of the make, model, year, engine type, and "options" available in a damaged vehicle is needed in order to recall repair and replacement estimate information from the vehicle data base of the present invention. As shown in FIG. 4, vehicle identification number 45 is entered next to VIN. Clicking once on the box next to "Make" causes a list (not shown) of various makes and models of automobiles to appear on screen 103. The user can select the make and model of the damaged vehicle by clicking once on the correct make and model in the list. An example is shown in line 43 of screen 103. In a similar manner, the user selects the year and engine type for the selected make and model. With respect to the "Options" line, the options listed by the application program (not shown) are those that are available for the make and model specified by the user. An example of available options for a vehicle identified by the user is shown in box 48 in screen 103. The desired options are selected by clicking once on the listed options.

Figure 5A:
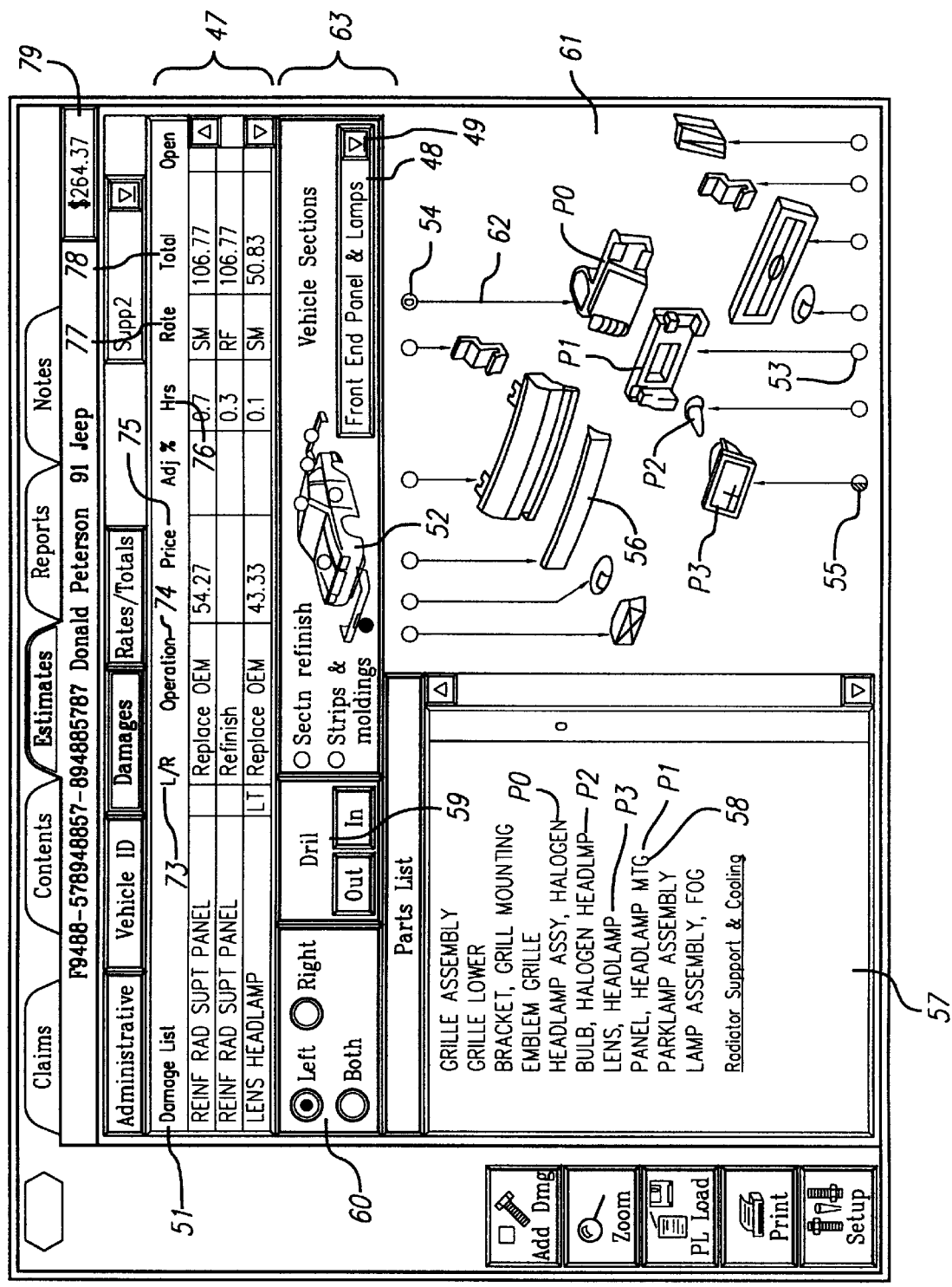
FIG. 5A shows a screen in the Damages page of the present invention. This screen is shown in the "split mode."
Figure 5B:
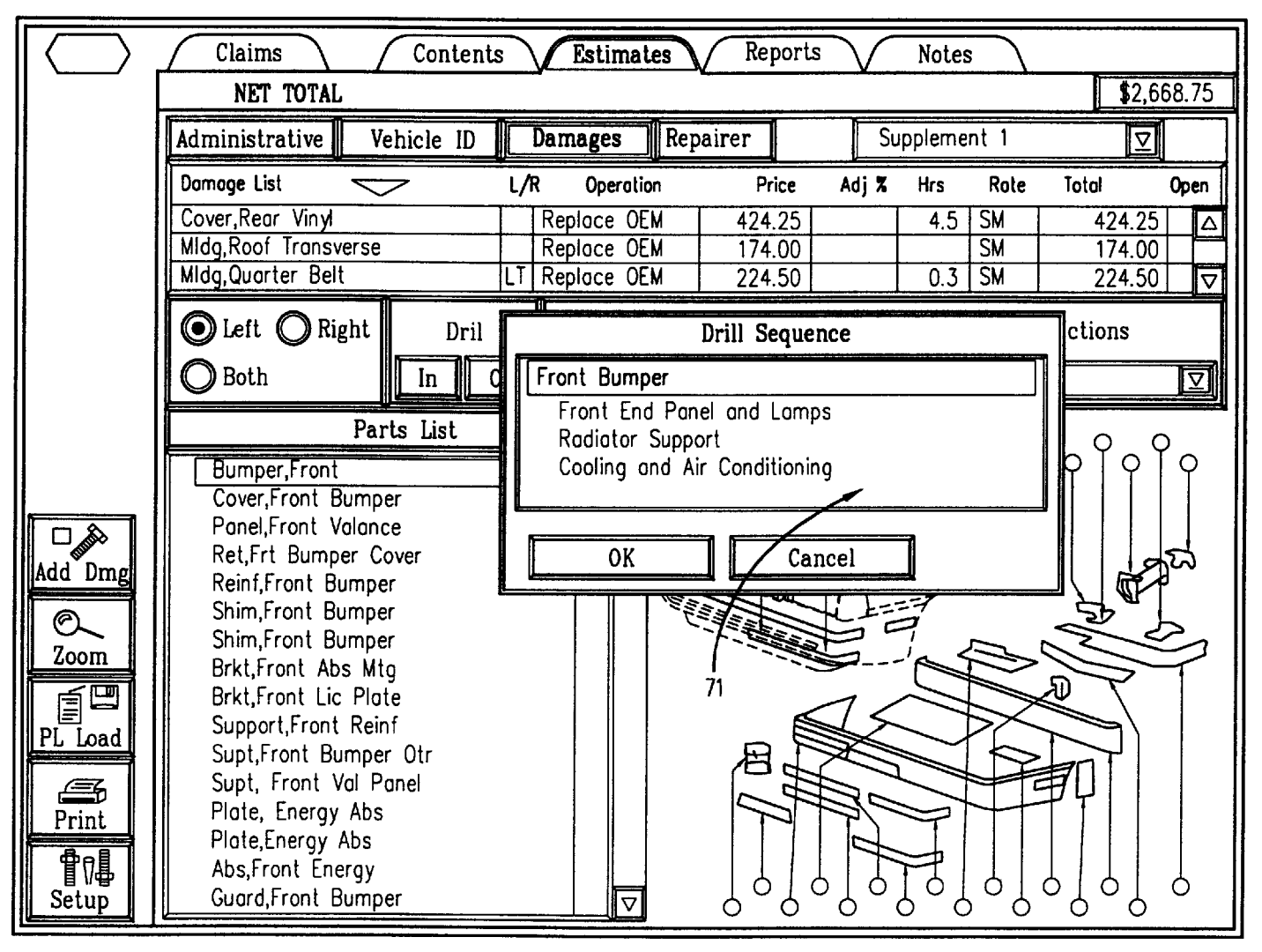
Figure 5C:
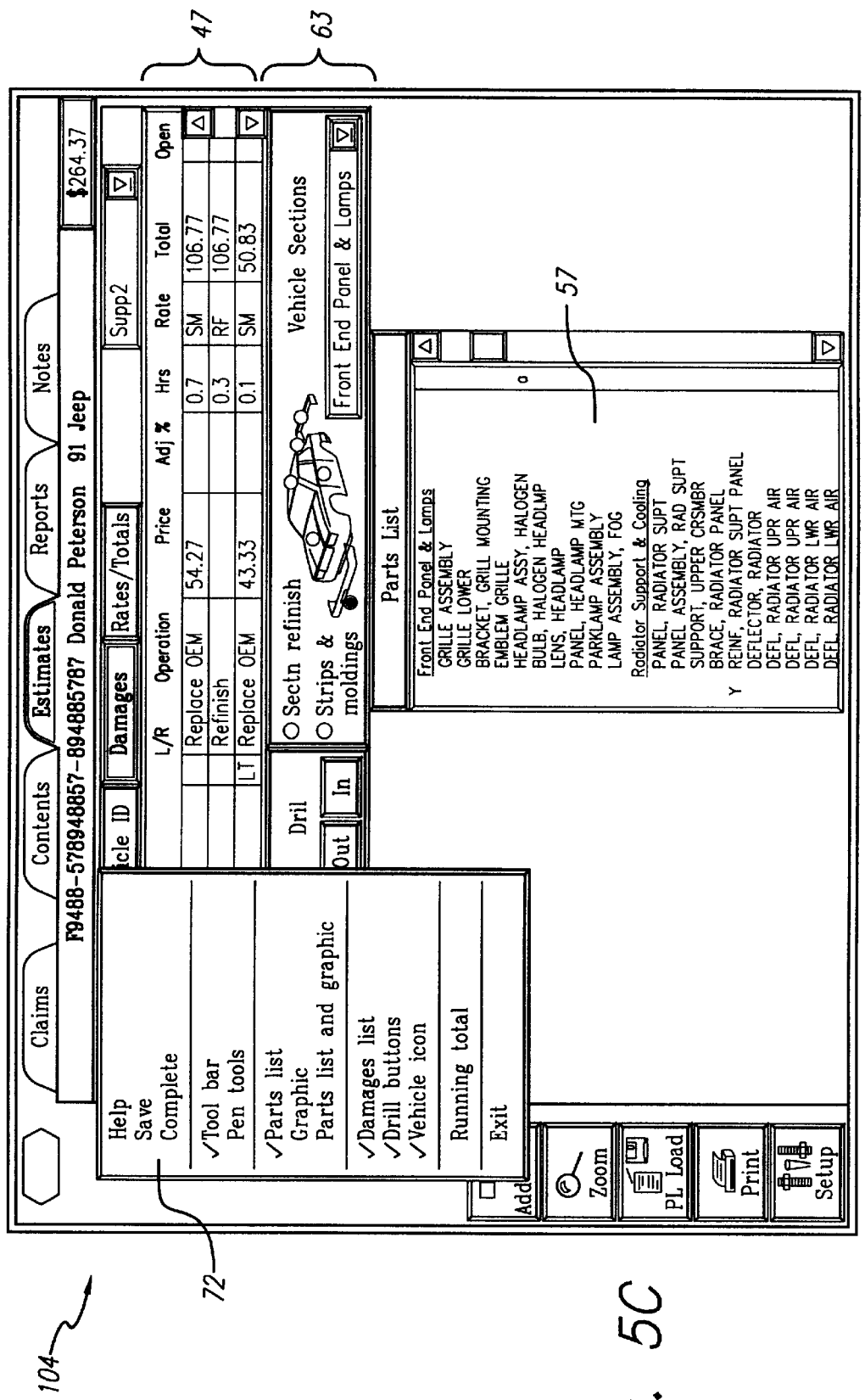
FIG. 5C shows a list displaying some of the options that are available to a user for displaying items of interest.

The next page under Estimates folder 16 is the Damages page. Clicking once on Damages 50 label causes a Damages screen of the Damages page to be opened. The operations performed and the options available in the Damages page of the present invention provide a number of advances in the art of insurance estimating. FIGS. 5A through 5C show screens 103 through 105 which provide an overview of the types of operations and options available in the Damages page of the present invention. Screen 103 in FIG. 5A is shown in a "split mode," i.e. screen 103 is divided into two sections. One section is textual list section 57, and the other section is graphics section 61. Each line in textual list section 57 is the name of a vehicle part whose graphics icon is displayed in graphics section 61. Conversely, each graphics icon, such as graphics icon 56, in graphics section 61 corresponds to a name of a vehicle part in textual list 57. Each one of the many small circles in graphics section 61 is a "hot spot," such as hot spot 53. Each hot spot is associated with a unique graphics icon by means of an arrow, such as arrow 62, pointing to the corresponding graphics icon (each arrow is also referred to as a "pointer" in this application). The hot spots, graphics icons, and vehicle part names in the textual list are the three different means by which the present invention allows a user to select desired vehicle parts for repair, replacement, or other operations. The hot spots, graphics icons, and vehicle part names in the textual list are also referred to as "identifiers" in the present application.

Figure 7:
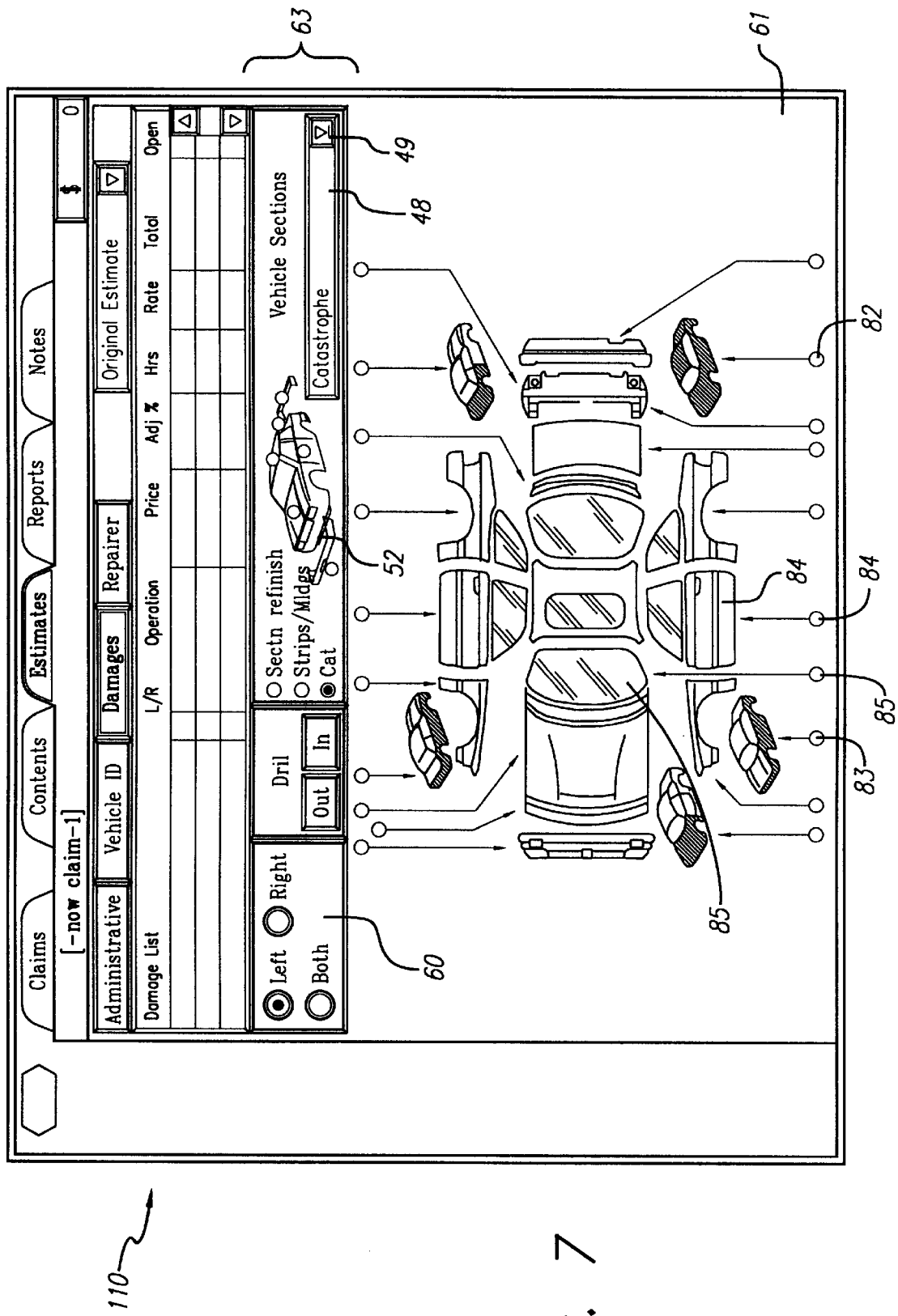
FIG. 7 shows the screen displayed when the catastrophe mode of the invention is selected.

Navigation bar 63 is located atop and borders graphics section 61 and textual list 57. Navigation bar 63 allows a user to find, display, and select various parts of a vehicle. From right to left, navigation bar 63 is comprised of a vehicle sections list. The vehicle sections list is activated by clicking once on button 49 which causes a list of main vehicle sections and vehicle subsections available for the selected vehicle to appear on screen 103 (this list is not shown in FIG. 5A). Each main vehicle section or vehicle subsection in the list corresponds to a unique "layer" of vehicle parts (hereinafter, the term "layer" is used to refer to either a main vehicle section or a vehicle subsection). For example, the exterior sheet metal of the vehicle is one of such layers, and a main vehicle section called "catastrophe" represents that layer (the exterior sheet metal layer) in the vehicle section list. Other layers are arranged in groups and in the order of increasing distance from the exterior sheet metal of the vehicle. The exterior sheet metal of the vehicle is the outermost layer for all vehicles and is also called the "catastrophe" layer as stated above (the catastrophe layer is shown in FIG. 7). One of the main vehicle sections below the catastrophe vehicle section (or the catastrophe layer) is, for example, the "front end panel and lamps" vehicle subsection (or the "front end panel and lamps" layer). When the user selects a particular main vehicle section or a vehicle subsection, its name is automatically displayed in a rectangular box 48, as shown in FIG. 5A.

The following discussion illustrates how the vehicle layers are arranged according to our invention (the vehicle layers discussed below are not shown in any of the drawings unless a drawing is specially stated to show a particular vehicle layer). As stated above, the catastrophe layer is the outermost layer of all vehicles. A special layer that can be thought of as a part of the catastrophe layer, but that is given its own separate name, is the "stripes and moldings" layer. The stripes and moldings layer does not have any other layer beneath it. Other main vehicle sections and vehicle subsections are comprised of a number of layers, each layer having at least one other layer next to it. Some layers have a layer located below and a layer located above, some layers have just a layer located below, or just a layer located above. "Front bumper" is one of the main vehicle sections immediately below the catastrophe layer. As examples of other main vehicle sections immediately below the catastrophe layer are "front body and windshield," "wheels," "roof," and "front doors" (these main vehicle sections are given only as examples since these are not all of the main vehicle sections that are immediately below the catastrophe layer). Layers located under these main vehicle sections are vehicle subsections. Each main vehicle sections is comprised of a number of vehicle subsections.

Figure 8:
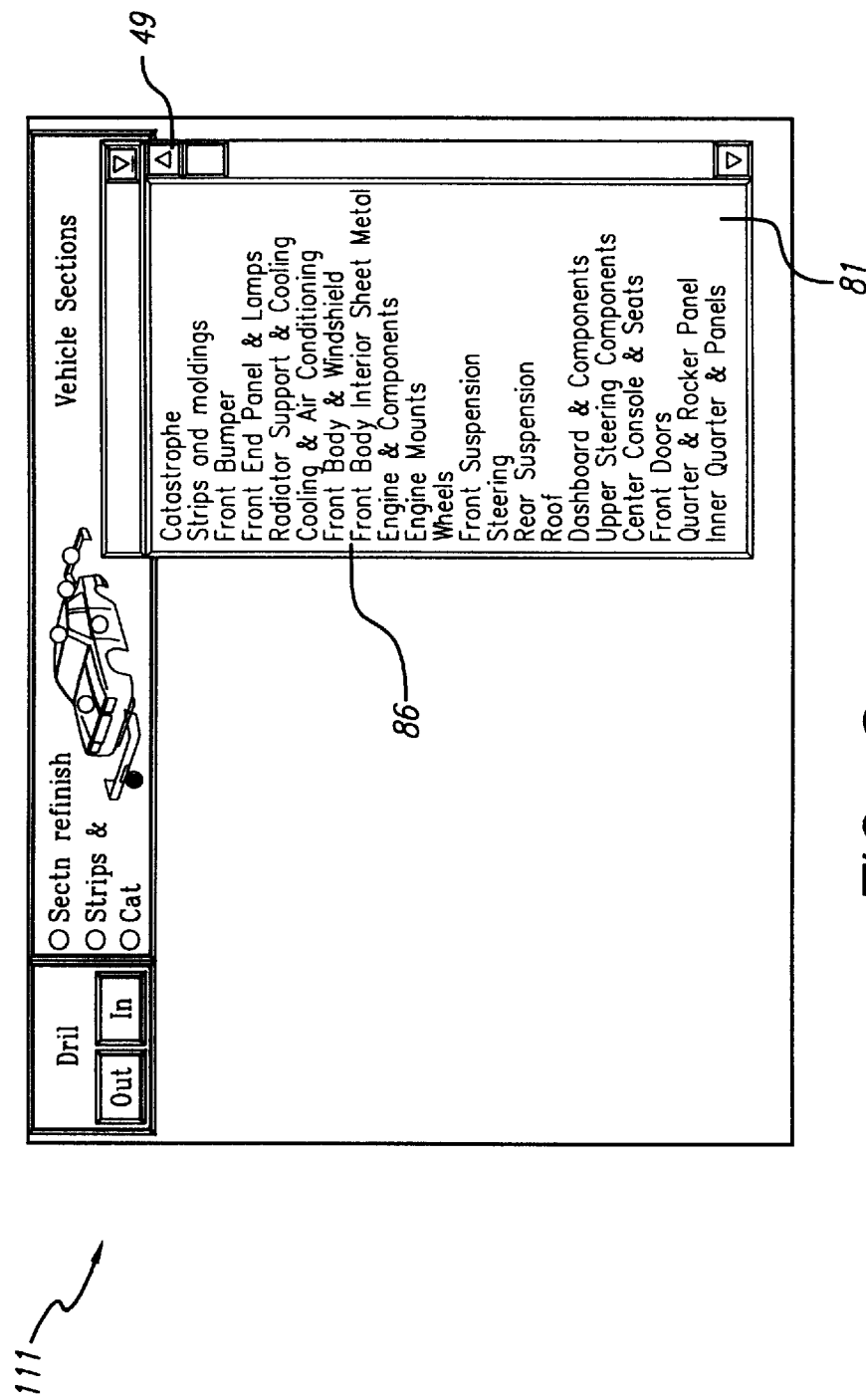
FIG. 8 shows a sample list of the main vehicle sections and subsections of the present invention.

As an example of layers located under the front bumper layer, in the order of increasing distance from the exterior sheet metal, are: "front end panel and lamps," "radiator support and cooling," and "cooling and air conditioning." These layers are thus vehicle subsections that are located under the main vehicle section of front bumper. Layers under the front body and windshield layer, again in the order of increasing distance from the exterior sheet metal, are: "front body interior sheet metal," "engine and components," and "engine mounts." These layers are thus vehicle subsections that are located under the main vehicle section of front body and windshield. Layers located under the wheels layer, in the order of increasing distance from the exterior sheet metal, are: "front suspension," "steering," and "rear suspension." These layers are thus vehicle subsections that are located under the main vehicle section of wheels. Layers located under the roof layer, in the order of increasing distance from the exterior sheet metal, are: "dashboard and components," "upper steering components," and "center console and seats." These layers are thus vehicle subsections that are located under the main vehicle section of roof. Layers located under the front doors layer, in the order of increasing distance from the exterior sheet metal, are: "quarter and rocker panel," and "inner quarter and panels." These layers are thus vehicle subsections that are located under the main vehicle section of front doors (a sample list 81 of the main vehicle sections and subsections discussed above is shown in FIG. 8).

As stated above, each vehicle section is comprised of a number of vehicle parts. These parts can be displayed in graphics section 61 and/or listed in textual list section 57. For example, FIG. 5A shows vehicle parts for the front end panel and lamps vehicle subsection (specific to the user selected vehicle) displayed in graphics section 61 and also listed in textual list section 57. Each main vehicle section or vehicle subsection is thus a subset of connected vehicle parts, the entire set of connected parts being the vehicle. Each one of the vehicle parts can be represented by at least three identifiers, namely, the graphics icons, hot spots, and names in the textual list. The user may select a vehicle part (for example, for repair or replacement) using any of these three identifiers.

Continuing with the overview and still referring to FIG. 5A, the next item displayed in navigation bar 63 is vehicle image 52. The vehicle image is a second way in which a main vehicle section may be selected (as discussed above, the first way is to use the vehicle section list). Each "identifier circle" on the vehicle image designates a main vehicle section. For example, in FIG. 5A, the identifier circle that appears dark indicates that the main vehicle section of front bumper is selected. The remaining identifier circles appear unshaded, indicating that their corresponding main vehicle sections have not been selected. The main vehicle sections corresponding to the unselected identifier circles are "front body and windshield," "wheels," "roof," "front doors," and "tailgate." It is noted that the identifier circles do not indicate which vehicle subsections (i.e. which layers below a main vehicle section) have been selected. For example, vehicle image 52 shown in FIG. 5A indicates that the main vehicle section selected is the front bumper section. However, the vehicle subsection displayed in graphics section 61, and listed in textual list 57, is the front end panel and lamps subsection as indicated in box 48. With regard to vehicle image 52, it is noted that although the vehicle parts recalled from the vehicle data base of the application program and all damage estimates correspond to the specific vehicle selected by the user during the vehicle identification procedure, there are only nine generic vehicle images 52 which are displayed in navigation bar 63. The nine generic vehicle images are: two door hatchback, four door hatchback, two door coupe, four door coupe, two door wagon, four door wagon, two door pick-up, four door pick-up, and van.

To the left of the vehicle image 52 in navigation bar 63, a maximum of three selection circles appear. FIG. 5A shows only two of these three selection circles, a third one is shown in FIG. 7. The first selection circle (shown in FIG. 5A) is "Section refinish." This selection circle is used if it is desired to refinish the entire exterior sheet metal or one of the main vehicle sections. The second selection circle (shown in FIG. 5A) is "Stripes and moldings" which is one of the main vehicle sections discussed above. This selection circle indicates that the stripes and moldings vehicle section has been selected. The stripes and moldings section can also be selected by means of activating the vehicle section list by clicking on button 49. The third selection circle (shown in FIG. 7) is "Catastrophe" which is also one of the main vehicle sections discussed above. This selection circle indicates that the catastrophe vehicle section has been selected. The catastrophe section can also be selected by means of activating the vehicle section list by clicking on button 49.

To the left of the selection circles is section 59 which allows a user to "drill in" or "drill out" of various layers of the vehicle. The "drill in" and "drill out" operations allow the user to conveniently select various layers of a vehicle for display on graphics section 61 and/or for listing in textual list section 57. The drill in button can be used for all vehicle layers except the lowest layers. For example, once the main vehicle section of front bumper is selected, clicking once on the drill in button causes the vehicle layer next to, and farther away from, the exterior sheet metal layer to be displayed and/or listed. That vehicle layer is the vehicle subsection front end panel and lamps which is displayed and listed in FIG. 5A. A second method to select the front end panel and lamps layer is by "dropping" the vehicle section list, such as list 81 shown in FIG. 8, by clicking once on button 49. List 81, shown in FIG. 8, displays both the main vehicle section front bumper and its respective subsections, including the front end panel and lamps layer, appearing below the front bumper. The user can then click once on the name "front end panel and lamps" appearing on this list, thereby selecting that vehicle subsection for display in graphics section 61 and/or for listing in textual list 57. Referring again to FIG. 5A, a third method to select the front end panel and lamps layer is to click twice on the front bumper identifier circle on vehicle image 52. This causes a "mini" list to appear that lists only those vehicle subsections below the main vehicle section of front bumper. This "mini" list is shown as list 71 in FIG. 5B. As shown there, the list contains the vehicle subsections: front end panel and lamps, radiator support, and cooling and air conditioning below the main vehicle section of front bumper. The user may then select the next lower layer, namely, the front end panel and lamps, as well as other lower layers, from this list.

After the front end panel and lamps vehicle layer is displayed and/or listed, the user may again click once on the drill in button and recall the next lower layer which is the radiator support layer. Alternatively, the user may use the second or third method described above to recall the radiator support layer. After this layer is displayed and/or listed, the user may again click once on the drill in button to recall the next lower layer, also being the lowest layer under the main vehicle section of front bumper, which is the cooling and air conditioning layer. Alternatively, the user may use the second or third method described above to recall the cooling and air conditioning layer.

The drill out button works similarly to the drill in button. The drill out button is used to recall layers located closer to the exterior sheet metal from the layer presently being displayed and/or listed. For example, if the presently displayed layer is the cooling and air conditioning layer, clicking once on the drill out button causes the radiator support layer to be recalled. Clicking once again on the drill out button causes the front end panel and lamps to be recalled. Clicking again on the drill out button causes the front bumper to be recalled. The second and third methods described above can also be used to recall the radiator support layer, front end panel and lamps, and front bumper layers.

As stated above, the exterior sheet metal of a vehicle (or the catastrophe layer) is the outermost layer of all vehicles. The catastrophe layer may be recalled by clicking once on the drill out button while a main vehicle section, such as the front bumper, is being displayed and/or listed. Alternatively, the second method described above can be used; that is, the user can drop vehicle section list 81 shown in FIG. 8 by clicking once on button 49 and then selecting the catastrophe layer by clicking once on "Catastrophe." A third method to recall the catastrophe section is to click once on the catastrophe selection circle discussed above. In short, the present invention allows the user to "drill in to" and "drill out of" various vehicle layers by different methods. This ability to perform drill in and drill out operations presents a major advance over the prior art since it permits easy and quick insurance estimating in addition to preventing errors.

Continuing with the overview and still referring to FIG. 5A, to the left of the drill in and drill out buttons is section 60 which allows a user to select whether a selected part belongs to the left, right, or both sides of a vehicle. If the selected part belongs to the left side only, the respective hot spot will have its left side darkened. This is shown by hot spot 55 in FIG. 5A. The "Lens, Headlamp" name in textual list 57 corresponds to hot spot 55 in graphics section 61. If the selected part belongs to the right side only, the respective hot spot will have its right side darkened (this is not shown in FIG. 5A). If the selected part belongs to the both sides of the vehicle, the respective hot spot will be completely darkened (not shown in FIG. 5A). According to the invention, if a user decides to seletect parts belonging to the left side of a vehicle, the remaining parts selected by the user would be defaulted as also belonging to the left side. The default can of course be overiddent by the user by indicating that the selected part belongs to the right side of the vehicle. Likewise, if a user decides to select parts belonging to the right side of a vehicle, the remaining parts selected by the user would be defaulted as also belonging to the right side. As before, the default can be overidden by the user by indicating that the selected part belongs to the left side of the vehicle.

Continuing with the overview, Damage summary area 47 in FIG. 5A indicates the vehicle parts selected for repair, replacement, or refinishing. From left to right, "Damages List" 51 portion of the Damage summary area 47 displays the last three entries in a list of damages. The user may view the entire list by clicking once on the arrow next to the words "Damages List." The vehicle parts that are listed in Damages List 51 are those parts that have been selected by either of the following two methods. The first method is clicking twice on one of the three "identifiers" discussed above. That is, by clicking twice on a hot spot, graphics icon, or vehicle part name in the textual list, all identifying the vehicle part to be selected. After the twice clicking on any one of the identifiers, the vehicle part is selected for a default operation. The default operation is, depending on the part selected, either an automatic replacement of the selected part or an automatic replacement and refinishing. Thus, upon selection of a part, the invention determines whether the default operation for the selected part requires refinishing in addition to replacement. "Operation" 74 heading in Damage summary area 47 lists the operations that are to be performed on a selected part. "L/R" 73 heading next to operations 74 heading indicates whether the selected vehicle part belongs to the left, right, or both sides of the vehicle. "Price" 75 heading indicates the cost of the selected vehicle part (if the operation is a replacement). "Hrs" 76 heading indicates the number of hours of labor for performing the selected operation. "Rate" 77 contains codes corresponding to the hourly rate for performing the selected operation. "Total" 78 indicates the line total, including any cost for replacement and the cost of labor, for the selected operation. Box 79 contains the grand total of all selected operations, including any that are not shown in Damage summary area 47 (recall that only the last three damage entries are displayed in this area).

The default operation on a selected vehicle part, selected by clicking twice on any one of the identifiers, can be overridden. This is accomplished by clicking only once on any one of the identifiers. Thereafter, clicking once on operation 74 gives the user options of available operations for the selected part. For example, the user may override a replacement operation with a repair operation, or override a replacement operation with a replacement and refinish operation. Likewise, clicking once on Prices 75, Hrs 76, or Rates 77 allows the user to override the respective default numbers for the selected vehicle part. Instead of selecting defaults and overriding them later, the user may simply begin by clicking only once on any one of the identifiers in order to use his or her own "customized" operation, prices, hours, and rates. In that case, there are no defaults to be overridden; there are simply blanks to be filled in.

Figure 5D:
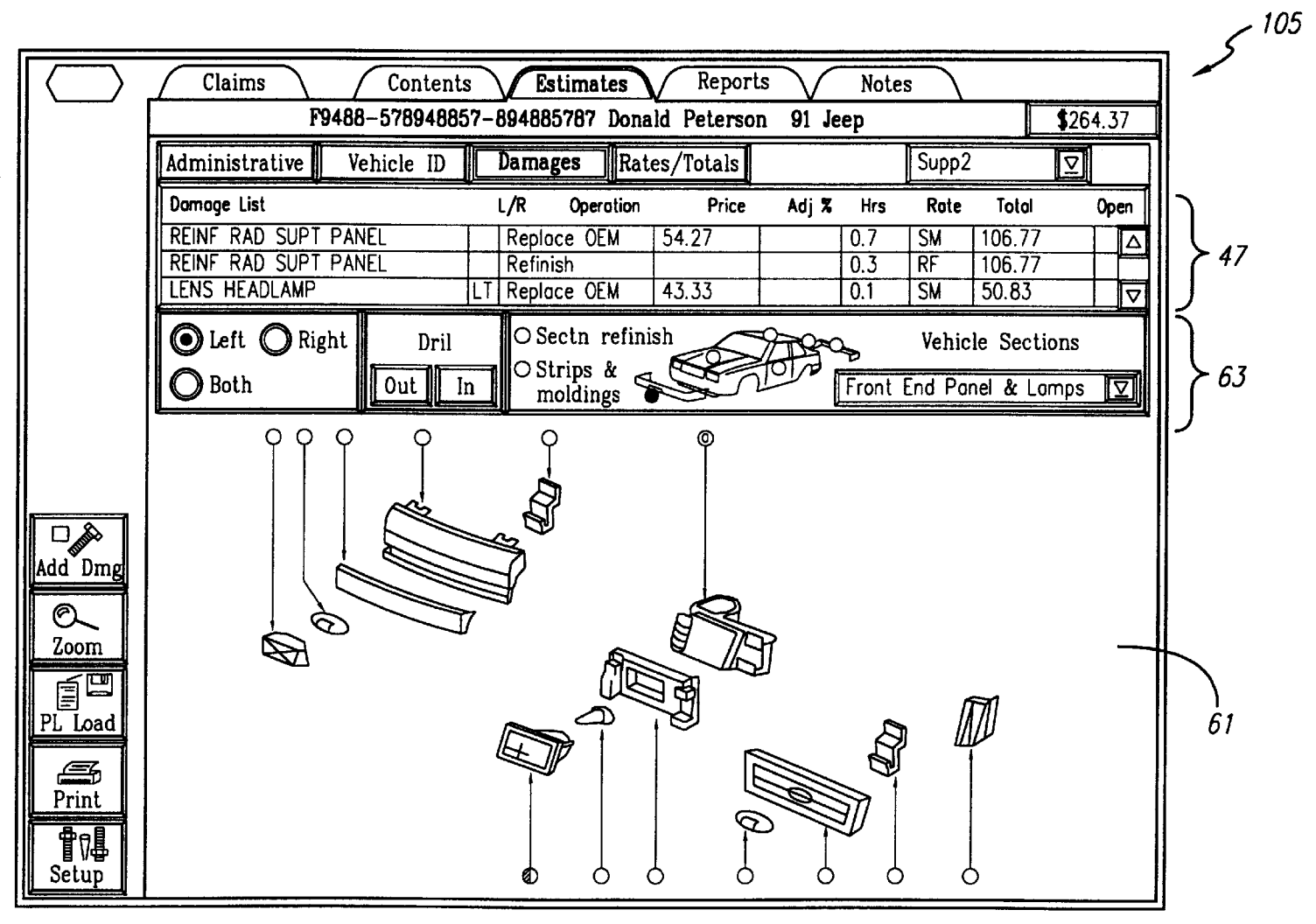

Referring to FIG. 5C and continuing with the overview, list 72 shows some of the options that are available to a user for displaying items of interest. For example, as indicated by the check marks next to items listed, the "tool bar" (i.e. navigation bar 63), "parts list" (i.e. textual list 57), "damages list" (i.e. Damage summary area 47), "drill buttons" (i.e. section 59), and "vehicle icon" (i.e. vehicle image 52) have been selected by the user for display on screen 104. "Graphic" (i.e. graphics section 61) and "parts list and graphic" (i.e. a split mode for displaying both textual list 57 and graphics section 61) are deselected as shown in list 72. FIG. 5D shows an example of a user selecting display of graphics section 61, and deselecting display of textual list 57. Thus, while FIG. 5A shows screen 103 in a "split mode," FIG. 5C shows an example of displaying the textual list only, and FIG. 5D shows an example of displaying graphics section 61 only.

Figure 6A:
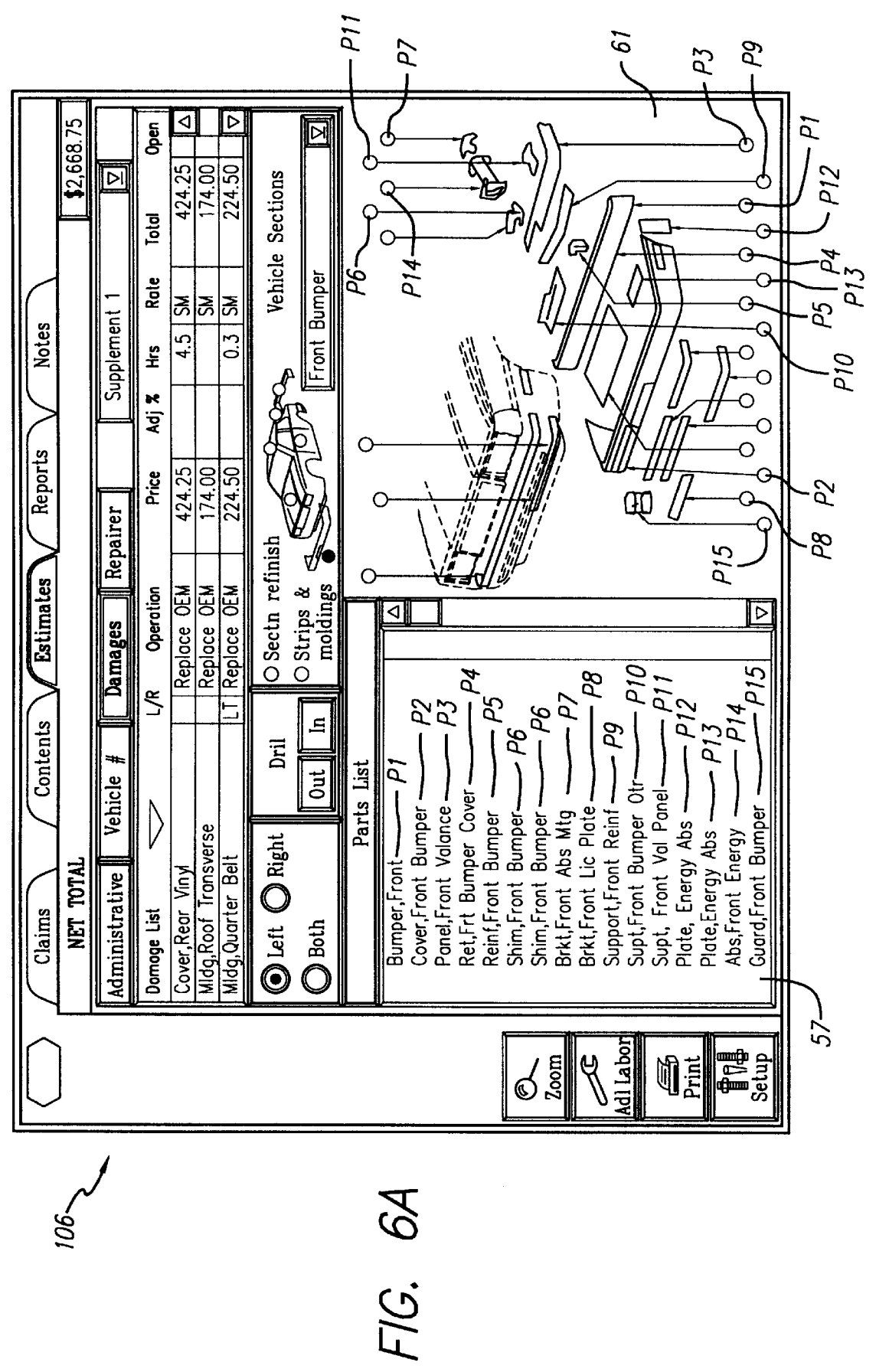

Three features of the present invention that are particularly helpful in the insurance estimating system of the invention are described below in more detail. The first of these three features is the drill in and drill out feature. As stated above, this feature allows a user to select vehicle parts belonging to layers of various "depths." FIG. 6A shows the main vehicle section of front bumper selected by a user in a "split mode" (i.e., displaying both textual list 57 and graphics section 61 on screen 106). Textual list 57 is scrollable and contains the names of all of the vehicle parts displayed in graphics section 61; however, some of the names are not shown in textual list 57 of screen 106 due to length limitation of the list that can be displayed on the screen. It is noted that the main vehicle sections, vehicle subsections, and vehicle parts belong to the particular vehicle specified by the user during the vehicle identification procedure described above. Also, as with the discussions above, vehicle sections or subsections are also referred to as vehicle layers in the following discussion.

The vehicle parts that are listed in textual list 57 are: front bumper (P1), front bumper cover (P2), front valance panel (P3), front bumper cover (P4), front bumper reinforcement (P5), front bumper shim (P6), front mounting bracket (P7), front license plate bracket (P8), front reinforcement support (P9), front bumper support (P10), front valance panel support (P11), energy absorption plate (P12), energy absorption plate (P13), front energy absorber (P14), and front bumper guard (P15). All of these parts are displayed on graphics section 61 and are identified by their respective hot spots. For example, front license plate (P8) is identified by hot spot P8 shown in graphics section 61 of screen 106.

Figure 6B:
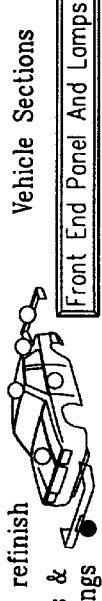
FIG. 6B shows a screen displayed when the user "drills into" the layer immediately below the front bumper layer, that is the front end panel and lamps layer.

FIG. 6B shows screen 107 displayed when the user "drills into" the layer immediately below the front bumper layer, that is the front end panel and lamps layer. The "drill in" is performed by any of the three methods described above. As with FIG. 6A, FIG. 6B is shown in the "split mode." Also, textual list 57 is scrollable and contains the names of all of the vehicle parts displayed in graphics section 61; however, some of the names are not shown in textual list 57 of screen 107 due to length limitation of the list that can be displayed on the screen.

The vehicle parts that are listed in textual list 57 are: grille assembly (P1), grille applique (P2), grille emblem (P3), outer capsule assembly (P4), inner capsule assembly (P5), outer beam retention ring (P6), inner beam retention ring (P7), outer sealed beam (P8), inner sealed beam (P9), headlamp mounting panel (P10), parklamp assembly (P11), parklamp socket (P12), side marker lamp (P13), front side marker socket (P14), grille assembly (P15), and front panel filler (P16). All of these parts are displayed on graphics section 61 and are identified by their respective hot spots. For example, grille assembly (P15) is identified by hot spot P15 shown in graphics section 61 of screen 107.

Figure 6C:
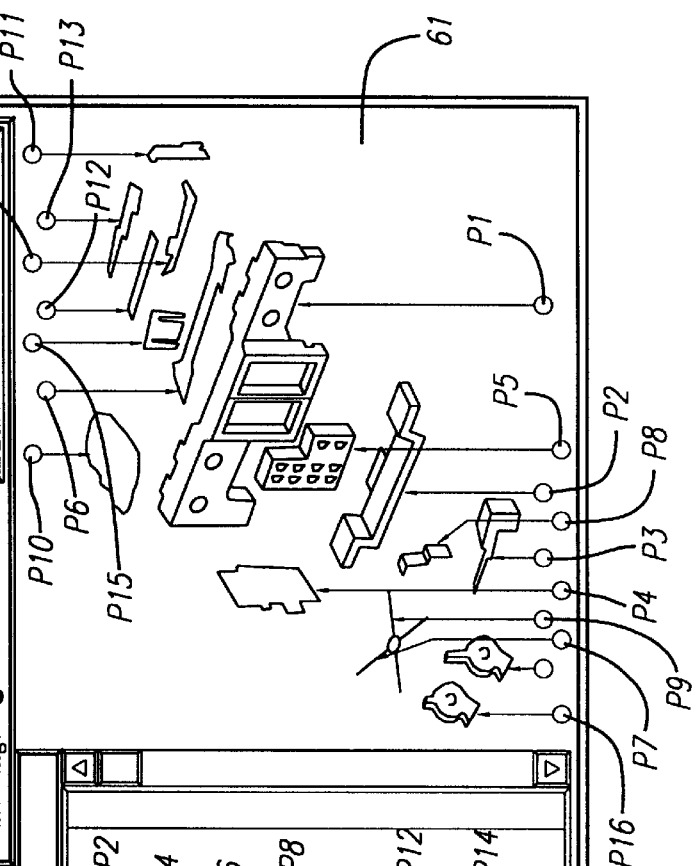
FIG. 6C shows a screen displayed when the user "drills into" the layer immediately below the front end panel and lamps layer, that is the radiator support layer.
Figure 6C:
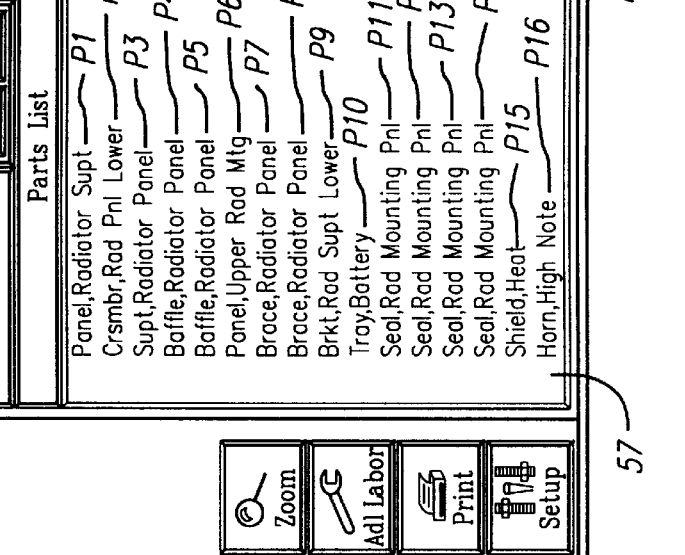

FIG. 6C shows screen 108 displayed when the user "drills into" the layer immediately below the front end panel and lamps layer, that is the radiator support layer. Again, the "drill in" can be performed by any of the three methods described above. As with FIGS. 6A and 6B, FIG. 6C is shown in the "split mode." Further, textual list 57 is scrollable and contains the names of all of the vehicle parts displayed in graphics section 61; however, some of the names are not shown in textual list 57 of screen 108 due to length limitation of the textual list that can be displayed on the screen.

The vehicle parts that are listed in textual list 57 are: radiator support panel (P1), radiator lower panel (P2), radiator panel support (P3), a first radiator panel (P4), a second radiator panel (P5), upper radiator mounting panel (P6), a first radiator panel brace (P7), a second radiator panel brace (P8), radiator support lower bracket (P9), battery tray (P10), a first radiator mounting panel seal (P11), a second radiator mounting panel seal (P12), a third radiator mounting panel seal (P13), a fourth radiator mounting panel seal (P14), heat shield (P15), and high note horn (P16). All of these parts are displayed on graphics section 61 and are identified by their respective hot spots. For example, radiator support panel (P1) is identified by hot spot P1 shown in graphics section 61 of screen 107.

Figure 6D:
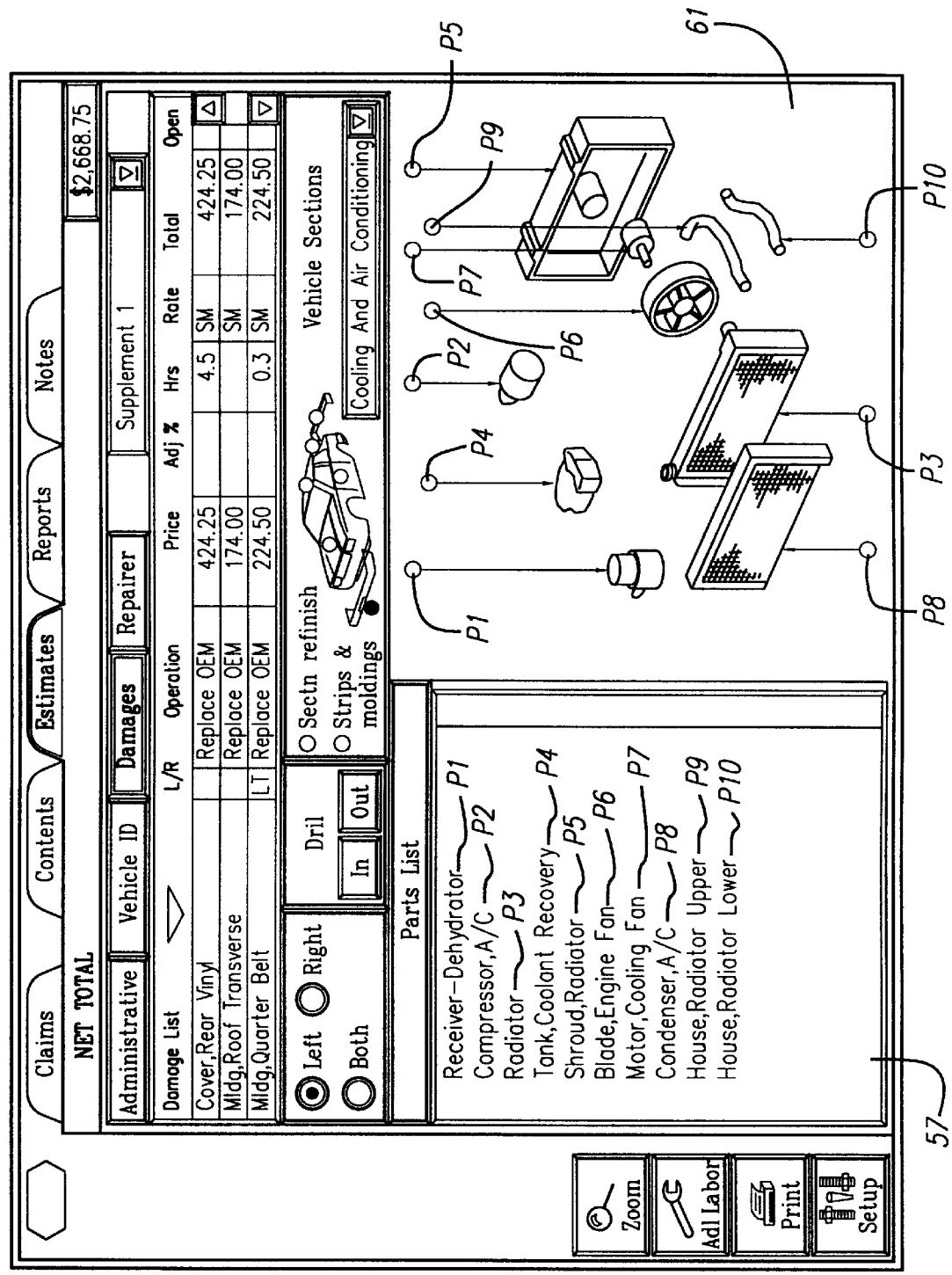
FIG. 6D shows a screen displayed when the user "drills into" the layer immediately below the radiator support layer, that is the cooling and air conditioning layer.

FIG. 6D shows screen 109 displayed when the user "drills into" the layer immediately below the radiator support layer, that is the cooling and air conditioning layer. The "drill in" can be performed by any of the three methods described above. As with FIGS. 6A through 6C, FIG. 6D is shown in the "split mode." As with FIGS. 6A through 6C, textual list 57 is scrollable and contains the names of all of the vehicle parts displayed in graphics section 61; however, some of the names are not shown in textual list 57 of screen 109 due to length limitation of the list that can be displayed on the screen.

The vehicle parts that are listed in textual list 57 are: dehydrator receiver (P1), A/C compressor (P2), radiator (P3), coolant recovery tank (P4), radiator shroud (P5), engine fan blade (P6), cooling fan motor (P7), A/C condenser (P8), radiator upper hose (P9), and radiator lower hose (P10). All of these parts are displayed on graphics section 61 and are identified by their respective hot spots. For example, engine fan blade (P6) is identified by hot spot P6 shown in graphics section 61 of screen 109.

The second feature of our invention that is particularly helpful in insurance estimating is the catastrophe feature. FIG. 7 shows screen 110 when the catastrophe mode is selected. As stated above, there are three ways of invoking the catastrophe mode of the invention. The user can click once on the catastrophe selection circle, indicated by "Cat" in navigation bar 63 of screen 110. Alternatively, the user can drop down a list by touching button 49 in screen 110 and a list 81 shown in FIG. 8 appears. The user can then click on "Catastrophe" in list 81. This invokes the catastrophe mode of the invention. Yet another way to invoke the catastrophe feature is to click on the drill out button enough times to reach the catastrophe layer, which is always the highest layer of all drill sequences. Once the catastrophe mode is invoked, the outer layer of the vehicle, including the exterior sheet metal and the windshields, appears on graphics section 61. As shown in FIG. 7, in the catastrophe mode the application program displays various sections of the outer layer of the vehicle such as the rear bumper, rear window, windshield, doors, rear and front fenders, and the hood of the vehicle. Further, clicking on certain hot spots selects a combination of sections of the outer layer. For example, clicking on hot spot 82 selects all of the sections shown in graphics section 61, while clicking on hot spot 83 selects the left front fender, left door, and the left rear fender.

Although the parts recalled from the vehicle data base of the application program and all damage estimates correspond to the specific vehicle selected by the user in the vehicle identification procedure, the catastrophe feature displays only nine generic vehicle images 52. Moreover, in the catastrophe mode, vehicle sections displayed on graphics section 61 represent only the nine generic vehicle images. The nine generic vehicle images are: two door hatchback, four door hatchback, two door coupe, four door coupe, two door wagon, four door wagon, two door pick-up, four door pick-up, and van. In the catastrophe mode, the left and right parts of a vehicle appear separately in graphics section 61. In other words, unlike the graphics displays discussed thus far, in the catastrophe mode the user must select the left or right vehicle part on graphics section 61, as opposed to making the selection by the "Left," "Right," and "Both" selection circles in section 60. For this reason, the "Left," "Right," and "Both" selection circles in section 60 of screen 110 appear shaded, indicating their unavailability. As stated above, a user can select a particular catastrophe section, such as left door 84 in FIG. 7, and "drill into" that section by clicking on the drill in button, one layer at a time, to recall lower layers. From lower layers, the user can drill out back to the catastrophe layer by clicking on the drill out button, one layer at a time. By drilling into a particular catastrophe section, the user can select a vehicle subsection for repair, replacement, or other operations.

The present invention keeps track of which main vehicle sections or vehicle subsections were selected during a catastrophe estimating exercise. Accordingly, when the user utilizes a non-catastrophe mode to select a vehicle section or subsection for repair, replacement, or other operations, the invention prevents adding the vehicle section or subsection that was selected in an earlier catastrophe estimating exercise. For example, if the user had selected "windshield" 85 (FIG. 7) in the catastrophe mode, selection of "front body and windshield" 86 (shown in list 81 in FIG. 8) in a subsequent estimating exercise will not cause a doubling in the cost of repair, replacement, or other operations that are common to both the windshield section in the catastrophe mode, and the front body and windshield section in the non-catastrophe mode.

The flowchart in FIG. 9 further illustrates how the drill in and catastrophe features are implemented in the present invention. Step 121 is the first step in performing a drill in exercise. For simplicity, suppose that a vehicle section (as opposed to a vehicle subsection) is being presently displayed by the present invention. In step 123, the application program checks to see whether a vehicle section identifier circle on the vehicle image in the navigation bar is selected. If a vehicle section identifier circle is selected, the program searches the vehicle data base (step 127) for the vehicle section identified by the vehicle section identifier in step 123. In step 129, the program recalls the vehicle section identified in step 123. If no vehicle section was selected by a vehicle section identifier circle in step 123, the application program checks to see if any vehicle section names in the vehicle section list were selected in step 125. If a vehicle section name is selected, the program searches the vehicle data base (step 127) for the vehicle section identified by the vehicle section name in step 125. In step 129, the program recalls the vehicle section identified in step 125. If no vehicle section was selected by a vehicle section name in step 125, the application program returns to step 121 and checks again for vehicle section identifier circles on the vehicle image (step 123) or vehicle section names in the vehicle section list (step 125) until a vehicle section is selected.

Once the selected vehicle section is recalled from the vehicle data base in step 129, the program recalls a portion of the selected vehicle section called "array of primary parts structures" in step 131. The array of primary parts contains left and right specifiers, X-Y coordinates of the various polygons used to display the graphics icons, and X-Y coordinates of the hot spots pointing to the graphics icons. It is noted that some vehicle parts can be selected only once (either for the left or right side of the vehicle), or twice (for both the left and right sides of the vehicle). The left and right specifiers are used to keep track of selections of the vehicle parts that can be selected either once or twice. The X-Y coordinates of the polygons of graphics icons are used to display the vehicle parts that comprise the vehicle section that was just "drill into." Likewise, the X-Y coordinates of the hot spots pointing to the graphics icons decide the arrangement of hot spots on the screen and contain pointers to respective graphics icons. The array of primary parts structures is designed so that a user may exercise a variety of options to point to and select a desired vehicle part. These options are selecting a part by clicking on its graphics icon, hot spot, or the part name in the textual list. Further, the user does not need to separately recall and separately display and select left and right vehicle parts. The user may simply use the left and right selection circles on the screen to select the left, right, or both the left and right vehicle parts.

In step 133, the program recalls the left and right specifiers of vehicle parts belonging to the vehicle section recalled during the drill in exercise in step 129. In step 135, the program recalls the X-Y coordinates of polygons of vehicle parts belonging to the vehicle section recalled during the drill in exercise in step 129. In step 137, the program recalls the X-Y coordinates of the hot spots pointing to the vehicle parts belonging to the vehicle section recalled during the drill in exercise in step 129. Finally, in step 139 the graphic icons of the vehicle parts belonging to the vehicle section "drilled into," and their respective hot spots, recalled from the vehicle data base are displayed. Also, in step 139, the textual list is updated with the vehicle part names comprising the vehicle section recalled from the vehicle data base in step 129. A new drill in exercise can now be performed beginning with step 121.

The drill out feature of the invention also uses a similar routine as that explained with respect to the drill in routine, with the exception that the vehicle sections (or subsections) selected by the user belong to a layer higher, as opposed to a layer lower, than the layer presently displayed on the screen. The Appendix following the "detailed description of the invention" contains an example of the computer code utilizing an object oriented method for implementing the drill in, drill out, and catastrophe features of the invention.

The drill in, drill out, and catastrophe features of our invention have a number of advantages over the prior art. For example, the drill in and drill out feature allows a methodic approach to estimating damage to a vehicle. The insurance estimator can verify all parts of a vehicle that are damaged or that are undamaged. The insurance estimator first begins with a main vehicle section, such as the front bumper section. After determining the vehicle parts that are damaged in the front bumper, the estimator selects the damaged parts and enters a default or customized damage estimate in the damage summary area. Once damage to the main vehicle section is estimated, a lower layer, such as the front end panel and lamps layer, is recalled by utilizing the drill in feature. This permits the estimator to carefully consider damage to vehicle parts that are below a visibly damaged part. After determining the vehicle parts that are damaged in the front end panel and lamps layer, the estimator selects the damaged parts and enters a default or customized damage estimate in the damage summary area. Drilling into lower layers allows the estimator to methodically consider all parts that are not visibly damaged in performing the damage estimate to the entire vehicle.

Moreover, the drill out feature of the invention prevents oversight of damage to certain outer layers of the vehicle. For example, many insurance estimators have indicated that damage to interior parts of a vehicle may detract attention to damage to certain exterior parts. For example, damage to engine and related components has often detracted attention to damage to a broken windshield. With the insurance estimating system of the invention if an estimator pays especial attention to significant damage to the "engine and components" vehicle subsection, the estimator will be reminded to check damage to the "front body and windshield" main vehicle section in a drill out exercise. This is because the front body and windshield main vehicle section is a layer residing above the engine and components vehicle subsection.

The catastrophe feature of the invention also has many advantages over the prior art. Frequently vehicles, such as automobiles, receive damage to the entire outer layer, including the exterior sheet metal, windows, and windshield. Examples of this type of damage are damages from hail, flood, sand, and a vandal "keying" the exterior sheet metal. In these situations, the insurance estimator is primarily interested in evaluating damage to the outer layer of the vehicle. The catastrophe mode is particularly useful in this situation since all of the vehicle sections of interest are displayed on one screen and damage estimating is performed without the need to switch from one screen to another. For example, damage estimate to the front left fender and the front bumper can be accomplished without the need to first recall and display the front left fender for estimating damage, and then separately recall and display the front bumper. This also helps in reminding the insurance estimator to consider all of the various sections of the outer layer of the vehicle in performing the estimate. Moreover, in case of damage from natural phenomena, such as hail, sand, or flood, a large number of vehicles are damaged in a short period of time. By utilizing the catastrophe feature a large number of vehicles can be processed quickly and accurately in "drive through" insurance estimating centers. Furthermore, in any situation where a vehicle has been slightly damaged in the outer layer and the vehicle owner desires a quick estimating process, the catastrophe feature is particularly useful to expedite the damage estimating of the exterior of the vehicle.

Another feature of the invention that is particularly useful is that the invention allows the user to select a vehicle part in a variety of ways, and with a variety of options. This feature is referred to as the "multiple selection" feature. For example, as was discussed above, a user may select a vehicle part either by its graphics icon, its respective hot spot, or by selecting the vehicle part name on the textual list. As stated above, when a part belonging to the left, right, or both sides of a vehicle is selected, the hot spot corresponding to the vehicle part indicates this selection. For example, as shown by hot spot 55 in FIG. 5A, the left part of the hot spot circle is darkened upon selection of the left headlamp lens. An important aspect of the multiple selection feature of the invention prevents "double charging" when one of the vehicle parts belonging to a vehicle section or subsection is an "assembly" consisting of a number of "components." An assembly is indicated by the symbol "a" if the assembly is unselected, and by the symbol "A" if the assembly is selected. The unselected halogen headlamp assembly is indicated by "a" in hot spot 54 in FIG. 5A. This is also indicated by the symbol "a" next to the halogen headlamp assembly in textual list 57. The graphic icons for the components of an assembly are shown next to the graphic icon of the assembly itself. For example, headlamp mounting panel (P1), headlamp halogen bulb (P2), and headlamp lens (P3) are components of, and are shown next to, halogen headlamp assembly (P0) in FIG. 5A. The invention keeps track of selection of a component, such as headlamp halogen bulb (P2), for repair, replacement, or other operation. Thereafter, if the assembly itself is selected, for example if halogen headlamp assembly (P0) is selected, the invention deletes the cost of repair, replacement, or other operation that was earlier calculated for the component, which in the example is the cost of repair, replacement or other operation for headlamp halogen bulb (P2). Conversely, once an assembly is selected for repair, replacement, or other operation, the invention prevents double charging when the user inadvertently selects a component in a later estimation of damage to the vehicle. The Appendix following the "detailed description of the invention" contains an example of the computer code utilizing an object oriented method for implementing the "multiple selection" feature of our invention.

Figure 10A:
FIG. 10A shows a page of the "Rates/Totals" page.
Figure 10C:
FIG. 10C shows a page of the "Notes" folder.

The insurance estimating system of the invention includes a "Rates/Totals" page in the Estimate folder as shown in FIG. 10A. This page is used to adjust the cost of parts used in replacement of damaged parts, and also the cost of labor for repair, replacement, or other operations. The "Reports" folder of the invention, shown in FIG. 10B, contains a summary of claim information and damage estimates. This folder is used to do changes to the estimated damage after the Damages page has already been utilized. For example, if the estimator decides to correct or adjust cost of replacement of a vehicle part, the estimator may accomplish the correction or adjustment in the Reports folder, instead of going back to the Damages page. Thus, the Reports folder adds to the convenience of our insurance estimating system. FIG. 10C shows a page of the "Notes" folder. Each page in this folder is linked to a claim processed for a vehicle owner. The Notes folder allows entry of any notes that are helpful in processing the claim for which a damage estimate has been prepared. Upon recalling a claim for reprocessing or for obtaining information, the Notes page linked to the claim is also recalled and is available to the estimator for his or her review and/or modifications.

Thus, a novel insurance estimating system has been described.

We claim:

1. In a computer system, a method for estimating damage to a vehicle comprising the steps of:

displaying a plurality of identifiers representing vehicle parts;

selecting an identifier, said identifier representing a layer of said vehicle parts, said layer comprising an entire exterior sheet of said vehicle; and estimating damage to said vehicle using said layer of vehicle parts.

2. An article of manufacture comprising:

a computer usable medium having computer readable program code embodied therein for estimation damage to a vehicle, the computer readable program code in said article of manufacture comprising:

computer readable program code configured to cause a computer to display a plurality of identifiers representing vehicle parts;

computer readable program code configured to cause said computer to allow selection of an identifier, said identifier representing a layer of said vehicle parts, said layer comprising an entire exterior sheet of said vehicle; and computer readable program code configured to cause said computer to estimate damage to said vehicle using said layer of vehicle parts.

3. In a computer system, a method for displaying vehicle parts, said method comprising the steps of:

defining layers of vehicle parts, wherein each of said layers is comprised of a plurality of vehicle parts, each layer being located next to at least one other layer, whereby a vehicle is represented by a plurality of said layers;

displaying a first layer of vehicle parts;

selecting a second layer of vehicle parts adjacent to said first layer of vehicle parts; and displaying said second layer of vehicle parts.

4. The method of claim 3 wherein said vehicle is an automobile.

5. The method of claim 4 wherein an entire outer sheet metal of said automobile is an outermost layer of said plurality of layers.

6. The method of claim 5 wherein said plurality of layers are arranged in order of distance from said outer sheet metal of said automobile.

7. The method of claim 5 further comprising the step of selecting said entire entire exterior outer sheet metal of said automobile.

8. The method of claim 6 wherein said second layer is farther in distance from said outer sheet metal than said first layer.

9. The method of claim 6 wherein said second layer is closer in distance from said outer sheet metal than said first layer.

10. The method of claim 3 further comprising the step of selecting a vehicle part from said second layer of vehicle parts.

11. The method of claim 3 further comprising the step of selecting a vehicle part from said first layer of vehicle parts.

12. An article of manufacture comprising:

a computer usable medium having computer readable program code embodied therein for displaying vehicle parts, the computer readable program code in said article of manufacture comprising:

computer readable program code configured to cause a computer to define layers of vehicle parts, wherein each of said layers is comprised of a plurality of vehicle parts, each layer being located next to at least one other layer, whereby a vehicle is represented by a plurality of said layers;

computer readable program code configured to cause a computer to display a first layer of vehicle parts;

computer readable program code configured to cause a computer to allow selection of a second layer of vehicle parts adjacent to said first layer of vehicle parts; and computer readable program code configured to cause a computer to display said second layer of vehicle parts.

13. The article of manufacture of claim 12 wherein said vehicle is an automobile.

14. The article of manufacture of claim 13 wherein an entire outer sheet metal of said automobile is an outermost layer of said plurality of layers.

15. The article of manufacture of claim 14 wherein said plurality of layers are arranged in order of distance from said outer sheet metal of said automobile.

16. The article of manufacture of claim 14 further comprising computer readable program code configured to cause said computer to select said entire entire exterior outer sheet metal of said automobile.

17. The article of manufacture of claim 15 wherein said second layer is farther in distance from said outer sheet metal than said first layer.

18. The article of manufacture of claim 15 wherein said second layer is closer in distance from said outer sheet metal than said first layer.

19. The article of manufacture of claim 12 further comprising computer readable program code configured to cause said computer to select a vehicle part from said second layer of vehicle parts.

20. The article of manufacture of claim 12 further comprising computer readable program code configured to cause said computer to select a vehicle part from said first layer of vehicle parts.

* * * * *